United States Patent
Giloh et al.

(10) Patent No.: US 9,648,517 B2
(45) Date of Patent: *May 9, 2017

(54) ARCHITECTURE AND METHODS FOR TRAFFIC MANAGEMENT BY TUNNELING IN HIERARCHICAL CELLULAR NETWORKS

(71) Applicant: ELTA SYSTEMS LTD., Ashdod (IL)

(72) Inventors: Benjamin Giloh, Moshav Yaad (IL); Yaakov Shoshan, Ashkelon (IL); Adi Schwartz, Holon (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,008

(22) Filed: May 2, 2016

(65) Prior Publication Data
US 2016/0249254 A1 Aug. 25, 2016

Related U.S. Application Data

(63) Continuation of application No. 13/989,666, filed as application No. PCT/IL2011/050022 on Nov. 23, 2011, now Pat. No. 9,351,173.
(Continued)

(51) Int. Cl.
*H04L 12/28* (2006.01)
*H04W 28/14* (2009.01)
(Continued)

(52) U.S. Cl.
CPC ......... *H04W 28/14* (2013.01); *H04L 12/4633* (2013.01); *H04L 29/12575* (2013.01);
(Continued)

(58) Field of Classification Search
CPC ..... H04W 28/14; H04W 16/26; H04W 16/32; H04W 76/027; H04W 29/12575; H04W 74/8833; H04W 88/08; H04L 12/4633
See application file for complete search history.

(56) References Cited

U.S. PATENT DOCUMENTS 4,236,158 A 11/1980 Daniel
5,357,257 A 10/1994 Nevin
(Continued)

FOREIGN PATENT DOCUMENTS

CN 101523818 A 9/2009
EP 0 615 391 A1 9/1994
(Continued)

OTHER PUBLICATIONS

Wikipedia "Encapsulation (networking)," accessed 2015, available from http://en.wikipedia.org/wiki/Encapsulation_(networking).
(Continued)

*Primary Examiner* — Ian N Moore
*Assistant Examiner* — Phong La
(74) *Attorney, Agent, or Firm* — Oliff PLC

(57) ABSTRACT

A hierarchical cellular network system having a core and comprising a plurality of nodes, wherein at least one node comprises a relay; and wherein at least one relay includes: a tunneling sub-system; a backhauling link subsystem interfacing between the tunneling subsystem and a node which is closer to the core than the relay; and a base station subsystem, interfacing between the tunneling subsystem and a mobile station or a node which is further from the core than the relay, wherein the tunneling subsystem is operative to perform the following, on data arriving from a base station subsystem belonging to another node from among the plurality of nodes: collecting the data; and encapsulating the results to be sent in an individual session into packets and sending the packets to the Backhauling Link Subsystem.

23 Claims, 22 Drawing Sheets

Related U.S. Application Data

(60) Provisional application No. 61/417,049, filed on Nov. 24, 2010.

(51) Int. Cl.

| | | |
|---|---|---|
| *H04L 12/46* | (2006.01) | |
| *H04W 28/06* | (2009.01) | |
| *H04W 16/26* | (2009.01) | |
| *H04L 29/12* | (2006.01) | |
| *H04W 16/32* | (2009.01) | |
| *H04W 74/08* | (2009.01) | |
| *H04W 76/02* | (2009.01) | |
| *H04W 92/04* | (2009.01) | |
| *H04W 88/08* | (2009.01) | |

(52) U.S. Cl.
CPC .......... *H04W 16/26* (2013.01); *H04W 16/32* (2013.01); *H04W 28/065* (2013.01); *H04W 74/0833* (2013.01); *H04W 76/027* (2013.01); *H04W 88/08* (2013.01); *H04W 92/045* (2013.01)

(56) References Cited

U.S. PATENT DOCUMENTS

| | | |
|---|---|---|
| 5,363,111 A | 11/1994 | Murphy |
| 5,657,317 A | 8/1997 | Mahany et al. |
| 5,729,826 A | 3/1998 | Gavrilovich |
| 5,990,831 A | 11/1999 | McDowell |
| 6,115,409 A | 9/2000 | Upadhyay et al. |
| 7,986,915 B1 | 7/2011 | Wang et al. |
| 8,019,092 B2 | 9/2011 | Katic |
| 8,340,076 B2 | 12/2012 | Jetcheva et al. |
| 8,676,144 B2 | 3/2014 | Guo et al. |
| 2002/0006116 A1 | 1/2002 | Burkhart |
| 2003/0226091 A1 | 12/2003 | Platenberg et al. |
| 2004/0146024 A1 | 7/2004 | Li et al. |
| 2004/0185780 A1 | 9/2004 | Coupechoux et al. |
| 2004/0233882 A1 | 11/2004 | Park et al. |
| 2005/0073977 A1 | 4/2005 | Vanghi et al. |
| 2005/0102529 A1 | 5/2005 | Buddhikot et al. |
| 2005/0195767 A1 | 9/2005 | Rahman |
| 2005/0228613 A1 | 10/2005 | Fullerton et al. |
| 2006/0007882 A1 | 1/2006 | Zeng et al. |
| 2007/0183321 A1 | 8/2007 | Takeda et al. |
| 2008/0045215 A1 | 2/2008 | Chen et al. |
| 2008/0072014 A1 | 3/2008 | Krishnan et al. |
| 2008/0090575 A1 | 4/2008 | Barak et al. |
| 2008/0095282 A1 | 4/2008 | Walton et al. |
| 2008/0114863 A1 | 5/2008 | Baskey et al. |
| 2008/0188231 A1 | 8/2008 | Zhu et al. |
| 2008/0192677 A1 | 8/2008 | Abusch-Magder et al. |
| 2008/0291906 A1 | 11/2008 | Chigurupati et al. |
| 2009/0003243 A1 | 1/2009 | Vaswani et al. |
| 2009/0029645 A1 | 1/2009 | Leroudier |
| 2009/0083803 A1 | 3/2009 | Alshaykh et al. |
| 2009/0104911 A1 | 4/2009 | Watanabe et al. |
| 2009/0170475 A1 | 7/2009 | Ch'ng et al. |
| 2009/0190521 A1 | 7/2009 | Horn et al. |
| 2009/0247182 A1 | 10/2009 | Tamate |
| 2009/0325615 A1 | 12/2009 | McKay et al. |
| 2010/0046396 A1 | 2/2010 | Cai et al. |
| 2010/0046418 A1 | 2/2010 | Horn et al. |
| 2010/0103845 A1 | 4/2010 | Ulupinar et al. |
| 2010/0113090 A1 | 5/2010 | Lin et al. |
| 2010/0142445 A1 | 6/2010 | Schlicht et al. |
| 2010/0248619 A1 | 9/2010 | Senarath et al. |
| 2010/0260129 A1 | 10/2010 | Ulupinar et al. |
| 2010/0273504 A1 | 10/2010 | Bull et al. |
| 2010/0303182 A1 | 12/2010 | Daneshrad et al. |
| 2011/0081903 A1 | 4/2011 | Cai et al. |
| 2011/0182253 A1 | 7/2011 | Shekalim |
| 2011/0237231 A1 | 9/2011 | Horneman et al. |
| 2011/0296051 A1 | 12/2011 | Vange et al. |
| 2011/0320524 A1 | 12/2011 | Nandagopal |
| 2012/0140697 A1 | 6/2012 | Chen et al. |
| 2012/0214445 A1 | 8/2012 | Stojanovski et al. |
| 2012/0231797 A1 | 9/2012 | Van Phan et al. |
| 2012/0315916 A1 | 12/2012 | Van Phan et al. |
| 2013/0039214 A1 | 2/2013 | Yedavalli et al. |
| 2014/0023079 A1 | 1/2014 | Li et al. |
| 2015/0237564 A1 | 8/2015 | Wang et al. |

FOREIGN PATENT DOCUMENTS

| | | |
|---|---|---|
| EP | 1 453 246 A1 | 9/2004 |
| EP | 1 826 963 A2 | 8/2007 |
| GB | 2422272 A | 7/2006 |
| IL | 206455 | 7/2011 |
| WO | 2007/054849 A2 | 5/2007 |
| WO | 2008/011717 A1 | 1/2008 |
| WO | 2008/046089 A2 | 4/2008 |
| WO | 2009/134178 A1 | 11/2009 |
| WO | 2010/0006212 A2 | 1/2010 |
| WO | 2011/092698 A1 | 8/2011 |

OTHER PUBLICATIONS

Wikipedia "Tunneling Protocol," accessed 2015, available from http://en.wikipedia.org/wiki/Tunneling_protocol.

Okuda et al. "Multihop relay extension for WiMAX networks—overview and benefits of IEEE 802.16j standard," Fujitsu Sci Tec J, 44, 3, Jul. 2008, p. 292, available on web at http://www.fujitsu.com/downloads/MAG/v0144-3/paper10.pdf.

Sharp, "Information exchange over a wireless X2 interface between relay nodes," 3GPP TSG RAN WG2 Meeting #66, San Francisco, May 2009, pp. 1-3.

Teyeb et al., "Dynamic Relaying in 3GPP LTE-Advanced Networks," EURASIP Journal on Wireless Communications and Networking, Hindawi Publishing Corporation, vol. 2009, Jan. 2009, pp. 1-11.

Alnajjar et al., "SNR/RP Aware Routing Algorithm: Cross-Layer Design for Manets," International Journal of Nireless & Mobile Networks, vol. 1, No. 2, Nov. 2009, pp. 127-136.

Yamkomeroglu, H., "Fixed and Mobile Relaying Technologies for Cellular Networks," Workshop in Applications 3nd Services in Wireless Networks, Jul. 2002, pp. 75-81.

Toussaint; "The Relative Neighbourhood Graph of a Finite Planar Set;" Pattern Recognition; 1980; vol. 12; No. 4; pp. 1-14.

Torlak; "Spatial Array Processing;" The University of Texas at Austin; http://users.ece.utexas.edu/~bevans/courses/ee381k/lectures/13_Array_Processing/lecture13/lecture13.pdf; pp. 1-25.

Hourani; "An Overview of Adaptive Antenna Systems:" Helsinki University of Technology; Postgraduate Course in Radio Communications (2004/2005); http://www.comlab.hut.fi/opetus/333/2004_2005_slides/Adaptive_antennas_text.pdf; pp. 1-5.

Loadman et al.; "An Overview of Adaptive Antenna Technologies for Wireless Communications;" Communication Networks and Services Research Conference; 2003; Session A3; pp. 15-19.

Santamaria et al.; "Optimal Mimo Transmission Schemes with Adaptive Antenna Combining in the RF Path;" 16th European Signal Processing Conference; Aug. 25-29, 2008; http://gtasweb.dicom.unican.es/files/Publicaciones/Congresos/Eusipco2008_MIMAX.pdf.

Das; "Smart Antenna Design for Wireless Communication using Adaptive Beam-forming Approach;" National Institute DF Technology, Rourkela; http://dspace.nitrkl.ac.in:8080/dspace/bitstream/2080/832/1/das1.pdf.

Kootsookos et al.; "Imposing pattern nulls on broadband array responses;" J. Acoust. Soc. Am.; 1999; vol. 105; No. 6; pp. 3390-3398.

Li et al.; "An Examination of the Processing Complexity of an Adaptive Antenna System (AAS) for WiMax;" 2nd IEE/EURASIP DSPEnabledRadio Conference; 2005; pp. 1-5.

Widrow et al.; "Adaptive Antenna Systems;" Proceedings of the IEEE; 1967; vol. 55; No. 12; pp. 2143-2159.

(56) References Cited

OTHER PUBLICATIONS

Litva et al.; Digital Beamforming in Wireless Communications; 1996; Artech House, Inc.; Norwood, MA.
Gross, F., "Smart Antennas for Wireless Communications," McGraw Hill, 2005.
Godara, C., "Smart Antennas," CRC Press, 2004.
Ahson, et al., "WiMAX Technologies, Performance Analysis, and QoS," CRC Press, 2008.
Cheuk, et al., "Null-steering LMS Dual-Polarised Adaptive Antenna Arrays for GPS," Journal of Global Positioning Systems (2005), vol. 4, No. 1-2: 258-267.
3GPP TS 36.300—Evolved Universal Terrestrial Radio Access (E-UTRA) and Evolved Universal Terrestrial Radio Access Network (E-UTRAN); Overall description; Stage 2, also available from http://www.3gpp.org/ftp/Specs/html-Info/36300.htm.
3GPP TS 36.302—Evolved Universal Terrestrial Radio Access (E-UTRA); Services provided by the physical layer, also available from http://www.3gpp.org/ftp/Specs/html-info/36302.htm.
Wikipedia, "Wideband," accessed 2015, available from http://en.wikipedia.org/w/index.php?title=Wideband&oldid=522580153.
Budsabathon, M., et al.: "Optimum Beamforming for Pre-FFT OFDM Adaptive Antenna Array," IEEE Transactions on Vehicular Technology, vol. 53, No. 4, Jul. 1, 2004, pp. 945-955, XP11115402, IEEE Service Center, Piscataway, NJ, US.
Fazel, K, "Narrow-band interference rejection in orthogonal multi-carrier spread-spectrum communications," Universal Personal Communications, 1994, Sep. 27, 1994, pp. 46-50, XP010131551, New York, NY, USA, IEEE.
U.S. Appl. No. 13/575,795, filed Jul. 27, 2012 in the name of Giloh.
U.S. Appl. No. 14/604,079, filed Jan. 23, 2015 in the name of Giloh.
U.S. Appl. No. 14/604,075, filed Jan. 23, 2015 in the name of Giloh.
U.S. Appl. No. 13/989,589, filed Aug. 29, 2013 in the name of Shoshan.
U.S. Appl. No. 13/989,666, filed Oct. 21, 2013 in the name of Giloh.

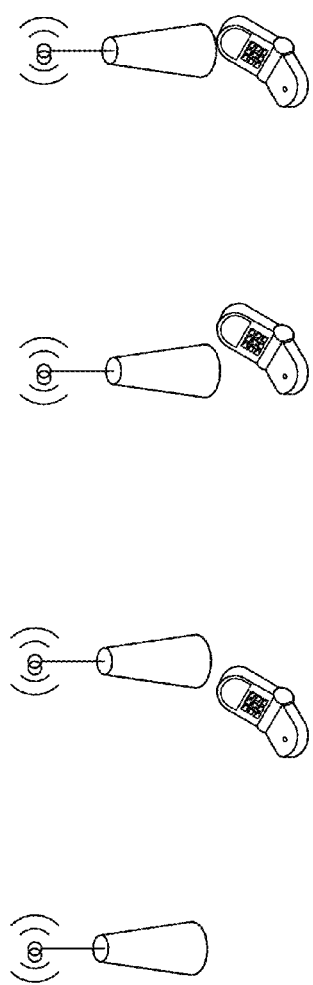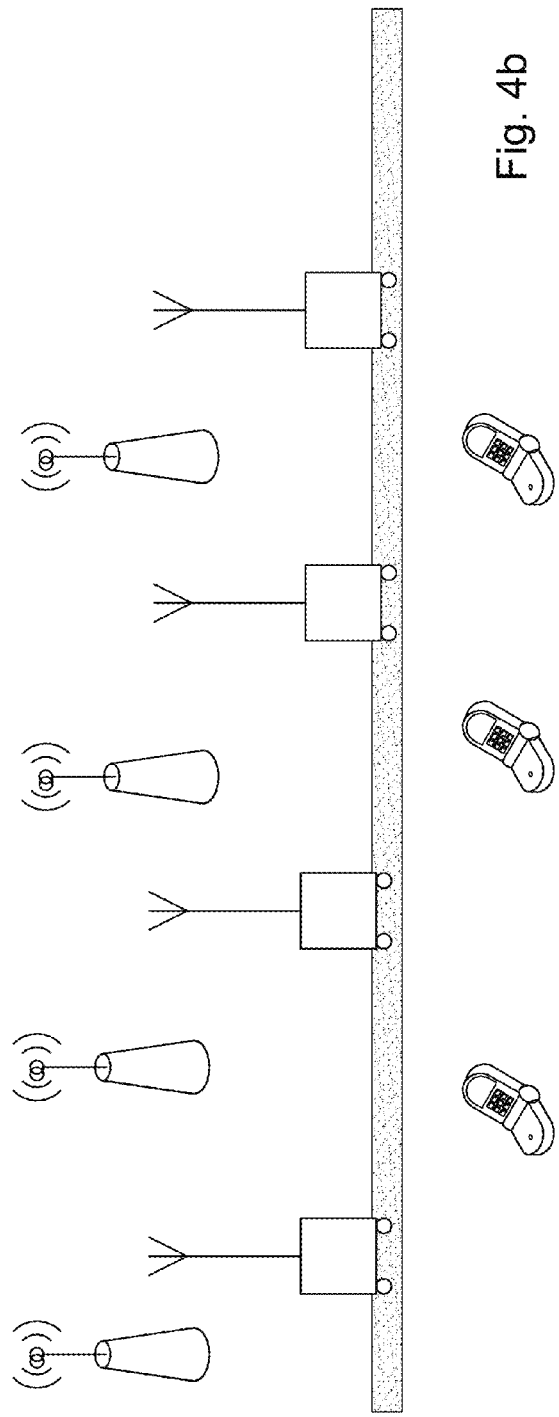

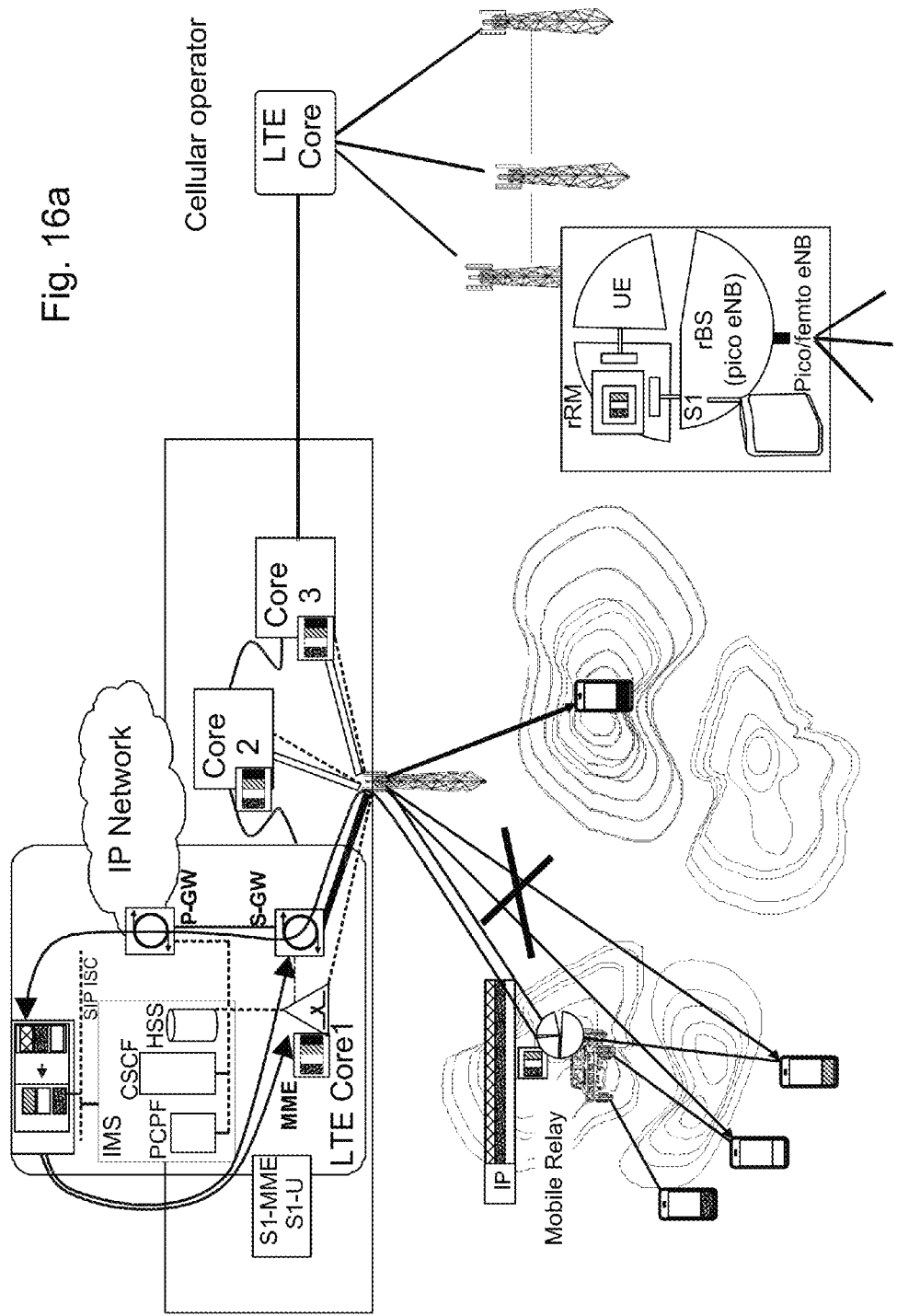

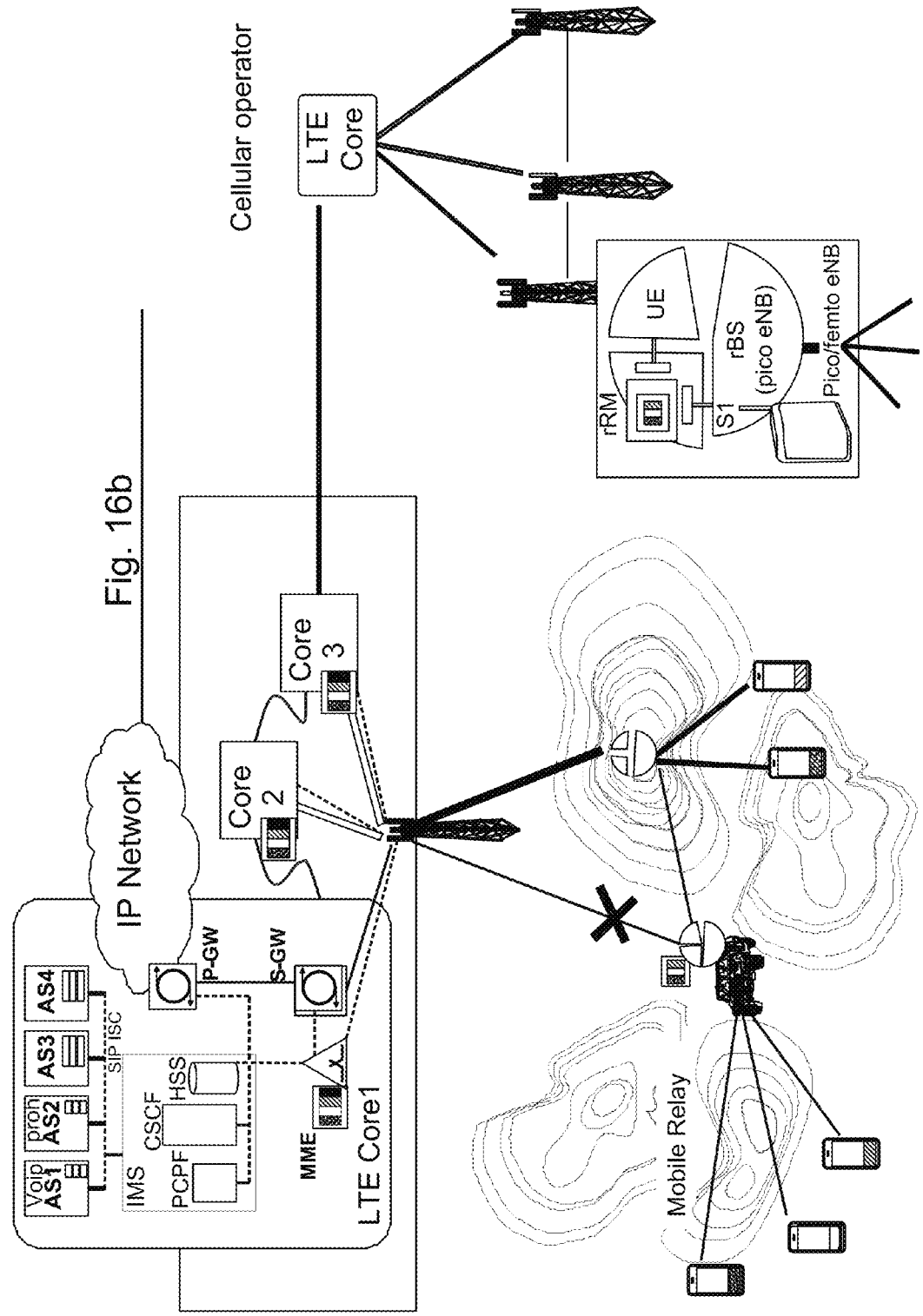

Fig. 17A

| RA | Moving relay agent having radio backhauling functionality as a core interface and base-station interface as an SM interface. Such as but not limited to the moving base stations described in Appendix A e.g. MrS units |
|---|---|
| BS | Stationary, typically conventional base-station, able to communicate e.g. conventionally with the core and with mobile communication device users |
| SM | Mobile communication device e.g. Standard mobile phone |
| Node | BS or RA or other node, typically not including endpoint nodes (phones), in a cellular communication network |
| Link | A potential connection between two nodes |
| Active link | A link that is currently being used to pass e.g. packets between two nodes |
| Link state | Quality grade e.g. indicating the potential information-to-noise ratio of a link |
| User | User of the mobile phones, which typically dynamically move across the service zone of the network |
| QOS | A parameter set of an application or user expressing a priority of that application or user relative to other applications or users served by the same cellular communication network. The |

| | |
|---|---|
| | QOS may for example indicate different delay, error rate and/or guaranteed bit rate requirements |
| Core | Responsible for overall control of the SM and establishment of services |
| Resource allocation chain | A cellular network resource allocation, also termed herein "service establishment" or "service requirements establishment", typically allocated by each of a chain of cellular communication network nodes connecting two end-point nodes in the network, that guarantees at least one requirement (such as but not limited to QoS, bandwidth, minimum delay, maximal error rate) of a communication session between the two end-point nodes. An example Resource allocation chain is a bearer as defined in conventional protocols such as GSM, UMTS and LTE. |
| PS | Packet switched |
| CS | Context switched |
| RS | Relay server, residing typically inside the core and responsible for overall control of the SM and RA in the hierarchical system |
| RH | Relay helper residing inside the RA and responsible for the control of the SM and RA that are actively linked to its RA or to descendent/s thereof |

Fig. 17B

ARCHITECTURE AND METHODS FOR TRAFFIC MANAGEMENT BY TUNNELING IN HIERARCHICAL CELLULAR NETWORKS

REFERENCE TO CO-PENDING APPLICATIONS

This is a Continuation of application Ser. No. 13/989,666, filed Oct. 21, 2013, which is a national stage entry of PCT Application No. PCT/IL2011/050022, filed Nov. 23, 2011, which claims priority from U.S. Provisional Application No. 61/417,049, entitled "Architecture and Methods for Traffic Management by Tunneling in Hierarchical Cellular Networks," filed Nov. 24, 2010. The disclosures of the prior applications are hereby incorporated by reference herein in their entirety.

FIELD OF THE INVENTION

The present invention relates generally to communication systems and more particularly to mobile communication systems.

BACKGROUND OF THE INVENTION

Many cellular communication networks are known, e.g. hierarchical mobile systems as described in U.S. Pat. No. 5,657,317 to Mahany et al and U.S. Pat. No. 5,729,826 to Gavrilovich.

Some varieties of conventional tunneling are described in Wikipedia's entry on "tunneling protocol".

Some varieties of conventional encapsulation are described in Wikipedia's entry on encapsulation (networking).

LTE and Wimax are known standards for mobile communication networks.

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide an architecture in which the relay manager and encapsulation engine may be located at the core and, as alternatives, as application server or as S1-tunneling server.

Certain embodiments of the present invention seek to provide tunneling which supports differentiation of a network control message from user's data messages e.g. by using GPRS tunneling particularly designed for cellular phones. Typically, such tunneling supports rapid change in the anchoring point of the mobile device which is being tunneled to.

Certain embodiments of the present invention seek to provide encapsulation which is operative to deal with dynamic topology and/or temporary disconnections.

In accordance with an aspect of the presently disclosed subject matter, there is provided a hierarchical cellular system defining a hierarchic eUTRAN tree, the system including a hierarchical cellular network including nodes; and a Tunneling Subsystem inside each relay operative to perform encapsulation and de-capsulation inside each relay located at layers lower than the relay, of a hierarchic tree.

In accordance with an embodiment of the presently disclosed subject matter, there is provided a system comprising a Tunneling Server as part of the Core Segment of the network.

In accordance with an aspect of the presently disclosed subject matter, there is provided a hierarchical cellular system defining a hierarchic eUTRAN tree, the system including conventional elements of a hierarchical cellular network; and a Tunneling Server as part of the Core Segment of the network.

In accordance with an embodiment of the presently disclosed subject matter, there is provided a system wherein at least a portion of the tunneling server functionality is located as a standard Application Server interfacing the Core segment, connecting to the core by the SGi interface.

In accordance with an embodiment of the presently disclosed subject matter, there is further provided a system wherein at least a portion of the tunneling server functionality is located in a distributed way at the S1 interface between at least some eNBs and the Core Segment.

In accordance with an embodiment of the presently disclosed subject matter, there is yet further provided a system wherein at least a portion of the tunneling server functionality is located in a distributed way at the S1 interface between all eNBs and the Core Segment.

In accordance with an embodiment of the presently disclosed subject matter, there is yet further provided a system wherein all of the tunneling server functionality is located in a distributed way at the S1 interface between at least some eNBs and the Core Segment.

In accordance with an embodiment of the presently disclosed subject matter, there is yet further provided a system wherein all of the tunneling server functionality is located in a distributed way at the S1 interface between all eNBs and the Core Segment.

In accordance with an aspect of the presently disclosed subject matter, there is yet further provided an apparatus for data transmission between two mobile stations at a hierarchical cellular network or between MS of a hierarchical cellular network and any other user within the network or outside it, including a Tunneling Subsystem within the mobile, 4G (e.g.) base station (MBS e.g. MeNB), and a Tunneling Server at the Core Network.

In accordance with an embodiment of the presently disclosed subject matter, there is yet further provided an apparatus wherein the tunneling subsystem is at the Radio Access Network/eUTRAN.

In accordance with an aspect of the presently disclosed subject matter, there is yet further provided a mobile base station (MBS) generic architecture including at least some of a Backhauling Link Subsystem, Base-Station Subsystem, and between them, a Tunneling Subsystem. The backhauling link subsystem typically comprises a radio link that connects an mobile base station (MBS) to a base station or other mobile base station (MBS). For example the backhauling link subsystem may comprise an LTE modem In accordance with an embodiment of the presently disclosed subject matter, there is yet further provided an apparatus wherein the Tunneling Subsystem comprises an 4G mobile base station (MeNB) specific implementation for LTE.

In accordance with an embodiment of the presently disclosed subject matter, there is yet further provided an apparatus wherein the Tunneling Subsystem may provide some or all of the following functionalities: collection, analysis, sorting, queuing, partitioning and encapsulation.

In accordance with an embodiment of the presently disclosed subject matter, there is yet further provided an apparatus comprising an architecture for integrating the Tunneling capability at the Core Segment as Tunneling Application Server (centralistic).

In accordance with an embodiment of the presently disclosed subject matter, there is yet further provided an apparatus comprising a distributed architecture for integrating the Tunneling capability at the Radio Access Network characterized in that, if the destination is located at the same sub-tree, an X2 distributed approach is employed.

In accordance with an embodiment of the presently disclosed subject matter, there is yet further provided an apparatus wherein the X2 distributed approach is employed if the source and destination have joint mobile, 4G (e.g.) base station (MBS e.g. MeNB) at higher layers than themselves.

In accordance with an embodiment of the presently disclosed subject matter, there is yet further provided an apparatus comprising a distributed architecture for integrating the Tunneling capability at the Radio Access Network as a post-4G base station (eNB) entity apparent at each relevant eNB.

In accordance with an embodiment of the presently disclosed subject matter, there is yet further provided an apparatus wherein the relevant 4G base station (eNB) comprises an 4G base station (eNB) where 4G mobile base station (MeNB) are planned to be served.

In accordance with an aspect of the presently disclosed subject matter, there is yet further provided a Tunneling Server implementing a Tunneling Application Server including an Application Server interfacing the LTE core using the standard GSi interface, including an Encapsulation Engine and a Virtual Radio Access Network Manager.

In accordance with an aspect of the presently disclosed subject matter, there is yet further provided a Virtual Radio Access Network Manager applicable to a cellular network other than an LTE.

In accordance with an embodiment of the presently disclosed subject matter, there is yet further provided an apparatus wherein the virtual Radio Access Network manager is operative to imitate 4G (optionally) base station and to interface the LTE core at the standard eNB-to-Core links.

In accordance with an embodiment of the presently disclosed subject matter, there is yet further provided an apparatus wherein the virtual Radio Access Network manager is operative to interface the LTE core at at least one of the following: S1&X2 for LTE applications, Iub for 3G applications, Abis for GSM applications.

In accordance with an embodiment of the presently disclosed subject matter, there is yet further provided an apparatus wherein the Virtual Radio Access Network Manager is operative such that any type of data to be inserted to the LTE cellular network can be inserted using virtual MS/mobile communication device (UE) and virtual BS/eNB.

In accordance with an embodiment of the presently disclosed subject matter, there is yet further provided an apparatus wherein the Virtual Radio Access Network Manager reflects/imitates the 4G mobile base station (MeNB) decapsulated transmission as virtual 4G base station (eNB) to the LTE Core.

In accordance with an embodiment of the presently disclosed subject matter, there is yet further provided an apparatus wherein interfaces between the Virtual Radio Access Network Manager and the LTE Core are based on at least one of S1-U and S1-MME.

In accordance with an embodiment of the presently disclosed subject matter, there is yet further provided an apparatus wherein the Encapsulation Engine includes at least one functionality of the Encapsulation Subsystem of the mobile, 4G (e.g.) base station (MBS e.g. MeNB).

In accordance with an embodiment of the presently disclosed subject matter, there is yet further provided an apparatus wherein the Encapsulation Engine interfaces a P-GW (PDN-GW) element of the LTE core.

In accordance with an embodiment of the presently disclosed subject matter, there is yet further provided an apparatus wherein the Encapsulation Engine includes a multi-packet payload recursive IP encapsulation functionality.

In accordance with an embodiment of the presently disclosed subject matter, there is yet further provided an apparatus wherein X2 may be tunneled as in S1.

In accordance with an embodiment of the presently disclosed subject matter, there is yet further provided an apparatus wherein, in order to shorten the latency of X2-tunneled packets (distributed approach), the tunneling subsystem decapsulates every encapsulated packet and detects X2 packets addressed to at least one of itself and a descendant thereof.

In accordance with an embodiment of the presently disclosed subject matter, there is yet further provided an apparatus wherein the mobile base station (MBS) may have the topology tree of all network elements underneath it.

In accordance with an embodiment of the presently disclosed subject matter, there is yet further provided an apparatus wherein the analysis process includes a detection mechanism to find X2 messages addressed to at least one of a current mobile base station (MBS) and at least one descendant thereof.

In accordance with an embodiment of the presently disclosed subject matter, there is yet further provided an apparatus wherein an S1 framer comprises a X2 framer.

In accordance with an aspect of the presently disclosed subject matter, there is yet further provided a S1 Tunneling Server located between the eNBs and the LTE Core including at least one of an mobile base station (MBS)s Filter for detecting and filtering any packets arriving from mobile, 4G (e.g.) base station (MBS e.g. MeNB) at the S1 stream; a mobile base station (MBS) Combiner to add Encapsulated S1 packets to the basic S1 stream; and a Virtual Radio Access Network Manager and Tunneling Subsystem.

In accordance with an embodiment of the presently disclosed subject matter, there is yet further provided an apparatus including both Server and S1 Tunneling Server wherein each encapsulated transmission is sent to one or both of these.

In accordance with an embodiment of the presently disclosed subject matter, there is yet further provided an apparatus wherein decisions re where each encapsulated transmission is sent depends on at least one of the following parameters: user priority, required latency, user type, service type.

In accordance with an aspect of the presently disclosed subject matter, there is yet further provided a Virtual Core Manager entity that imitates Core functionalities and can interface at least one of a real Radio Access Network/eUTRAN or real Core/LTE Core.

In accordance with an embodiment of the presently disclosed subject matter, there is yet further provided an apparatus comprising "virtual MME" capability that reflects all control and mobility management messages arriving at at least one of the Tunneling Application Server or to S1 Tunneling Server, to the actual real MME using the standard MME-to-MME LTE interface.

In accordance with an embodiment of the presently disclosed subject matter, there is yet further provided an apparatus comprising an architecture for integrating the Tunneling capability at the Core Segment as S1/X2 Tunneling Server (centralistic).

In accordance with an embodiment of the presently disclosed subject matter, there is yet further provided a cellular architecture.

In accordance with an embodiment of the presently disclosed subject matter, there is yet further provided a system wherein each mobile communicator in the hierarchical network comprises a telephone.

In accordance with an embodiment of the presently disclosed subject matter, there is yet further provided a system wherein the mobile communicator comprises a cellular telephone.

In accordance with an embodiment of the presently disclosed subject matter, there is yet further provided a system wherein the network operates using an LTE standard.

In accordance with an embodiment of the presently disclosed subject matter, there is yet further provided a system wherein the network operates using a WIMAX standard.

In accordance with an aspect of the presently disclosed subject matter, there is yet further provided a method for manufacturing any of the systems shown and described herein.

In accordance with an embodiment of the presently disclosed subject matter, there is yet further provided a method for operating or using any of the systems shown and described herein.

In accordance with an embodiment of the presently disclosed subject matter, there is yet further provided a computer program product, comprising a computer usable medium having a computer readable program code embodied therein, the computer readable program code adapted to be executed to implement any of the methods shown and described herein.

The embodiments shown and described herein are particularly useful in conjunction with vehicle fleets in which vehicles, such as busses or trains or taxis, are equipped with mobile base-stations which may function as relays, and/or mobile telephones or other cellular communication devices.

For example, in rural areas where sole reliance on fixed cellular base-station coverage limits the capacity of mobile stations at long ranges, mobile base stations that are installed on transportable mobile platforms e.g. busses, trains, taxis can enable high data-rate applications such as web-browsing, video-streaming, and can also be used as relays between other mobile base stations and fixed base stations. In addition, mobile base stations as described herein can be installed on-board airplanes to enable passengers to communicate with a fixed cellular infrastructure using their own cellular phones. Finally, if a mass attended event is expected or has occurred, it may be desired to send a fleet of mobile base-stations to the location of that event for the duration of the event. For example, event organizers, e.g. cultural or sports event organizers, may own or hire such a fleet which may be sent on one occasion to a first city in which a massively attended popular music concert or rally is being held and on another occasion to a location in which Olympics or another mass-attended sports event is planned.

In a typical cellular telephone system, e.g. as depicted in prior art FIG. 1, an area is divided into cells where each cell has a serving BS. An SM moving in such a cellular network communicates by radio with the best BS. The BSs communicate with the core network and with each other by either using a direct cable, or by using point-to-point microwave.

Several procedures are common to all cellular telephone systems:

Handover is the procedure that runs when the SM moves between cells while it is in service.

Cell selection is the procedure that selects the best BS to link to.

A mobile ad-hoc network (MANET), e.g. as depicted in FIG. 2, is a well studied concept in prior art. MANET is defined as an autonomous system of mobile routes, their associated hosts being connected by wireless links, the union of which forms an arbitrary graph. Such networks have been introduced with little degree of success, due to many technical and organizational challenges among delays, power consumption and scalability.

A hierarchical mobile system, e.g. as depicted in FIG. 3, has two radio-interface serving entities; BS and RA. The BSs are static base stations and the RAs are moving base stations comprising a radio interface for a backhauling interface, and a base-station as a front end to the user. Due to dynamics in the hierarchical mobile system, it is difficult to use a directional antenna; therefore there is a need to use an omni antenna. The user can connect to a BS or to a RA using the same standard interface and is transparent to the kind that it is connected to.

In FIG. 3, SMs are numbered 03, 06, 07, 11 and 12. The RAs are numbered 02, 05 and 09. The BSs are numbered 01, 08 and 10. The core is numbered 4.

SM12 links to BS10, BS08 and RA09, its best link is to BS10 and therefore it has an active link to the BS10 and connects to the core through BS10. SM11 links to RA09 BS08 and BS10, its best link is to BS08 and therefore it has an active link to BS08. SM03 links to SB10, SB08 and RA09 its best link is to RA09 and therefore it has active link to RA09. SM06 links to RA09, RA05, RA02 and BS01 its best link is to RA09 and therefore it has active link to RA09. SM07 links to RA09, RA05, RA02 and BS01 its best link is to RA05 and therefore it has active link to RA05.

RA02 links to RA09, BS01 its best link is to BS01 and therefore it has active link to BS01. RA09 links to RA02, BS01 and BS08 its best link is to BS08 and therefore it has active link to BS08. RA05 links to RA02, BSOI and BS08 its best link is to BS02 and therefore it has active link to BS02.

Some or all of the following may be provided:

Apparatus for data transmission between two mobile stations at a hierarchical cellular network or between MS of a hierarchical cellular network and any other user within the network or outside it: Tunneling Subsystem within the mobile, 4G (e.g.) base station (MBS e.g. MeNB) e.g. at the Radio Access Network/eUTRAN, and a Tunneling Server at the Core Network.

mobile base station (MBS) generic architecture e.g. having Backhauling Link Subsystem, Base-Station Subsystem and between them the Tunneling Subsystem e.g. as shown at FIG. 9a, and, for an 4G mobile base station (MeNB) specific implementation for LTE, in FIG. 14.

The Tunneling Subsystem may include some or all of the building blocks shown in FIG. 9b, including some or all of collection, analysis, sorting, queuing, partitioning and encapsulation.

Architectures for integrating the Tunneling capability at the Core Segment include a Tunneling Application Server (centralistic); or a S1/X2 Tunneling Server (centralistic);

Distributed architectures for integrating the Tunneling capability at the Radio Access Network include:

if the destination is located at the same sub-tree (if the source and destination have joint mobile, 4G (e.g.) base station (MBS e.g. MeNB) at higher layers than themselves), an X2 distributed approach as described herein);

a post-4G base station (eNB) entity apparent at each relevant eNB, where "relevant" refers to where 4G mobile base station (MeNB) are planned to be served;

Tunneling Server implementation as Application Server (Tunneling Application Server) interfacing the LTE core using the standard GSi interface, including and Encapsulation Engine and Virtual Radio Access Network Manager.

A Virtual Radio Access Network Manager is applicable to any suitable cellular network, such as but not limited to LTE. It imitates a 4G (optionally) base station and interfaces the LTE core at the standard eNB-to-Core links (e.g. S1 &X2 for LTE, Iub for 3G, Abis for GSM, etc.). Using this entity, any type of data to be inserted to the LTE cellular network can be inserted using virtual MS/mobile communication device (UE) and virtual BS/eNB. In this case, the Virtual Radio Access Network Manager reflects/imitates the 4G mobile base station (MeNB) decapsulated transmission as virtual 4G base station to the LTE Core. FIG. 13 shows more detailed interfaces between the Virtual Radio Access Network (RAN) Manager and the LTE Core using S1-U (611) and S1-MME (610).

The Encapsulation Engine may be similar to the Encapsulation Subsystem of the mobile, 4G (e.g.) base station (MBS e.g. MeNB). FIG. 13 shows that this Engine interfaces the P-GW (PDN-GW) element of the LTE core.

The encapsulation may include multi-packet payload recursive IP encapsulation as described in FIG. 11.

X2 may be tunneled as in S1 e.g. as described herein. In order to shorten the latency of X2-tunneled packets (distributed approach), the tunneling subsystem may unfold (decapsulate) every encapsulated packet and may detect X2 packets addressed to it or to any of its descendants. To facilitate this, the mobile base station (MBS) may have the topology tree of all network elements underneath it. FIG. 9*b* may be updated in order to take into account X2 tunneling: the Analysis process may have a detection mechanism to find X2 messages addressed to the current mobile base station (MBS) or to any of its descendants; and the S1 framer (element 211*b*) may then comprise a X2 framer. 212*b*/211*b* may be divided to two paths: one for S1 and the other for X2. FIG. 13 may also be updated to include X2 tunneling to layer-0. The Virtual Radio Access Network Manager may have X2 connection of its virtual eNBs to the layer-0 X2 "cloud" of the real static eNBs. For any X2 messages addressed to any lower layers, the X2 tunneling may be the same as S1 tunneling.

A S1 Tunneling Server located between the eNBs and the LTE Core may include some or all of the internal blocks in FIG. 12*b*:

mobile base station (MBS)s Filter for detecting and filtering any packets arrive from mobile, 4G (e.g.) base station (MBS e.g. MeNB) at the S1 stream.

MBS Combiner to add Encapsulated S1 packets to the basic S1 stream, and/or

Virtual Radio Access Network Manager and Tunneling Subsystem typically having the functionality described for the previous architecture.

Detailed interfaces between the S1 Tunneling Server and the LTE Core may be as depicted in FIG. 15. It relays the S1-MME messages without any change to the MME. However the S1-U packets are processed using the abovementioned internal blocks to perform the Tunneling capability.

Combined architecture includes both a Tunneling Application Server and an S1 Tunneling Server. Each encapsulated transmission is sent to one or both of these, depending on suitable parameters such as but not limited to user priority, required latency, user type, service type.

A Virtual Core Manager entity imitates Core functionalities and can interface real Radio Access Network/eUTRAN or real Core/LTE Core. This entity has, e.g. for LTE, "virtual MME" capability that reflects all control and mobility management messages arriving the Tunneling Application Server or to S1 Tunneling Server, to the actual real MME using the standard MME-to-MME LTE interface.

It is appreciated that with regard to the s1 framer, the s1 framer may operate as a proxy of the core side for the link between the base station subsystem and the core. The interfaces may for example include S1-U, S1-MME, and X2. The s1 framer thus may function as a "Virtual Core Interface" vis a vis the Virtual Radio Access Network Manager located at the Server side.

Also provided is a computer program product, comprising a computer usable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and for memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "operating", "processing", "computing", "selecting", "generating", or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

SUMMARY OF THE INVENTION

Certain embodiments of the present invention relate to architecture and data transmission methods for use in hierarchal cellular networks.

A classical cellular network consists of Core segment and Radio Access Network (RAN). The Radio Access Network is comprised of base stations (BS) and mobile stations (MS). Each of the MS is typically connected to one of the BS.

Hierarchal cellular network (FIG. 1) is comprised of classical cellular network, however the Radio Access Network segment enables direct connection between Base Stations so that one BS is capable of relaying the traffic of the other BS to the Core segment or to other BS in higher layer that is connected to the Core segment, etc.).

IP encapsulation, also referred as Tunneling, is a well known technique for Mobile IP (MIP) cases that enables remote control and mobility management for mobile scenarios apparent at IP networks. Tunneling is a technique used when a Mobile Node is registering in a Foreign (remote) Network which assigns to it a new local IP address. In such cases, the Home Network needs to reroute all the packets assigned to the Mobile Node to the Foreign Network. Tunneling is a technique for realizing the reroute need in a way of defining Home and Foreign Agents that encapsulates all the traffic that passes from the Home Network to the Mobile Node by adding additional IP header over the original IP packets.

Multi-layer hierarchical dynamic cellular networks pose difficulties for traffic flow and management (i.e. the multi protocol-layers handling.).

BRIEF DESCRIPTION OF THE DRAWINGS

Prior art

Prior art

Prior art

Prior art FIGS. 4A-4B are simplified block diagram illustrations of a 2-tier hierarchical system as described in U.S. Pat. No. 5,729,826.

Prior art

Prior art

FIGS. 16A-16C illustrate an embodiment of the invention which may be useful in conjunction with the apparatus of co-pending Published PCT Patent Application WO/2011/

092698, entitled "Cellular Communication System With Moving Base Stations And Methods And Apparatus Useful In Conjunction Therewith".

FIGS. 17A-17B, taken together, are tables of terms used herein.

Figure 18:
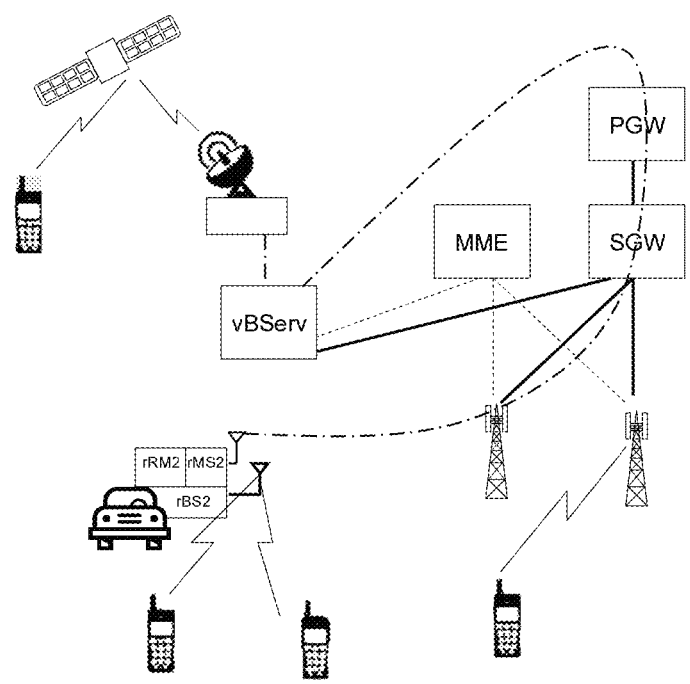

FIG. 18 is a semi-pictorial diagram of a virtual base station server (vBServ) which may be added to an LTE or other suitable cellular core network Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

The terms used herein, including but not limited to the following terms, may be construed either in accordance with any definition thereof appearing in the prior art literature or in accordance with the specification or drawings, or as follows:

active link: If nodes are actually transferring data between them, the link between them is termed an "active link". In some technologies e.g. 4G, a link is sometimes established as an active link in advance i.e. before it is actually needed to transfer data.

base station: The term "base station", which may be mobile or stationary, is intended to include, for example, a cellular base station such as but not limited to a 2G, 3G, 4G, or mobile Wimax cellular base station, as well as a wireless access point such as but not limited to a WiFi, Bluetooth or WiMax access point.

cellular: The term "cellular" is intended to include WiFi and other technologies which have a single cell i.e. access point. It is appreciated that access points may be interconnected outside the scope of the cellular network, e.g. via ADSL.

connected: Two network nodes are "connected" if they are capable of transferring data between them, e.g. over a wired or wireless link.

core; a switching functionality which activates connections between, ultimately, mobile communication devices. It is appreciated that the core may be co-located with a base station e.g. if the base station is an access point.

core segment: same as "core"

Decapsulation: the inverse operation to encapsulating downlink: link from core toward mobile communication device i.e. a link in a sequence or route (also termed downlink sequence or down-route) of one or more links connecting the core to the device.

encapsulation: generally refers to "covering" a message with an additional header such that the information in the message other than the header (such as a payload to be sent between two nodes in a communication network plus an original header indicating said two nodes) becomes the payload hence is not apparent until the additional header has been decapsulated. For example, node A wants to send a payload to node B, Node A sends the payload to node C which is en route to node B. However, node C does not know how to reach node B hence sends the payload (encapsulated with an additional header which states that the destination is D; the payload corresponding to the additional header hence includes the payload from A to B plus the first header indicating B destination) to a node D that does know how to reach node B. D decapsulates, uncovers the additional header, finds the first header, discerns that the packet is for B, and sends to B.

establish a link: activate a link i.e. cause a link to become active hierarchical network: a communication network wherein at least one mobile communication device is served by a first base station, also termed herein a "relay", which communicates with the core via a sequence of L>=1 linked base stations including: (a) optionally, L-1 base stations connected to one another hence also termed herein "relays", and (b) a second base station which is connected to the core.

radio interface: apparatus using radio technology to provide a link.

relay: see definition of "hierarchical network"

relay apparatus: synonymous to "relay"

rsSINR: reference signal's Signal to Interference-plus-Noise Ratio, a known metric which may be computed e.g. as described in co-pending published PCT Patent Application WO/2011/092698, entitled "Cellular Communication System With Moving Base Stations And Methods And Apparatus Useful In Conjunction Therewith".

served by: connected via an active link uplink: link from a mobile communication device toward the core i.e. a link in a sequence or route (also termed uplink sequence or up-route) of one or more links connecting the device to the core.

Figure 1:
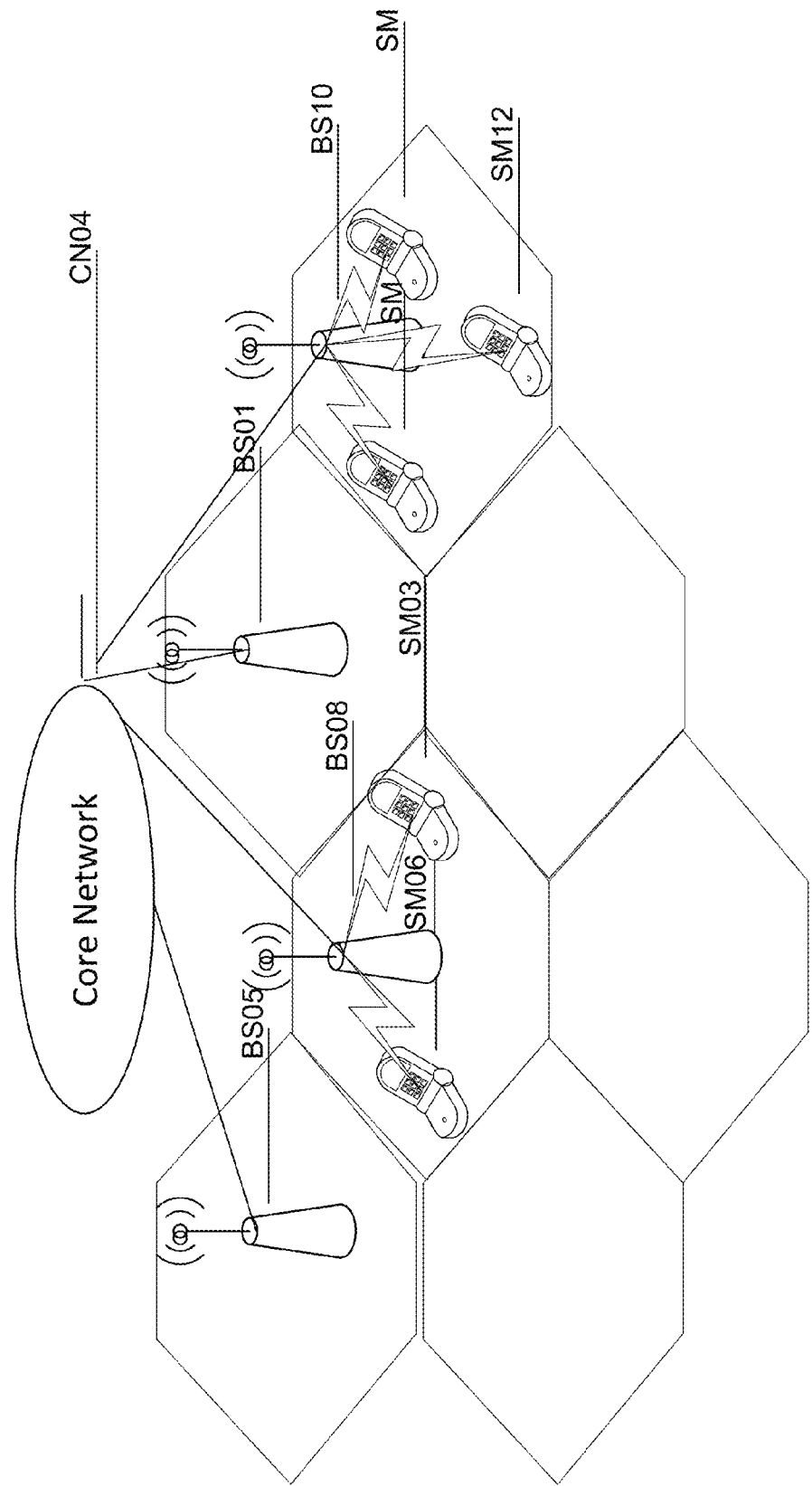
FIG. 1 is a semi-pictorial diagram of a conventional cellular system.
Figure 2:
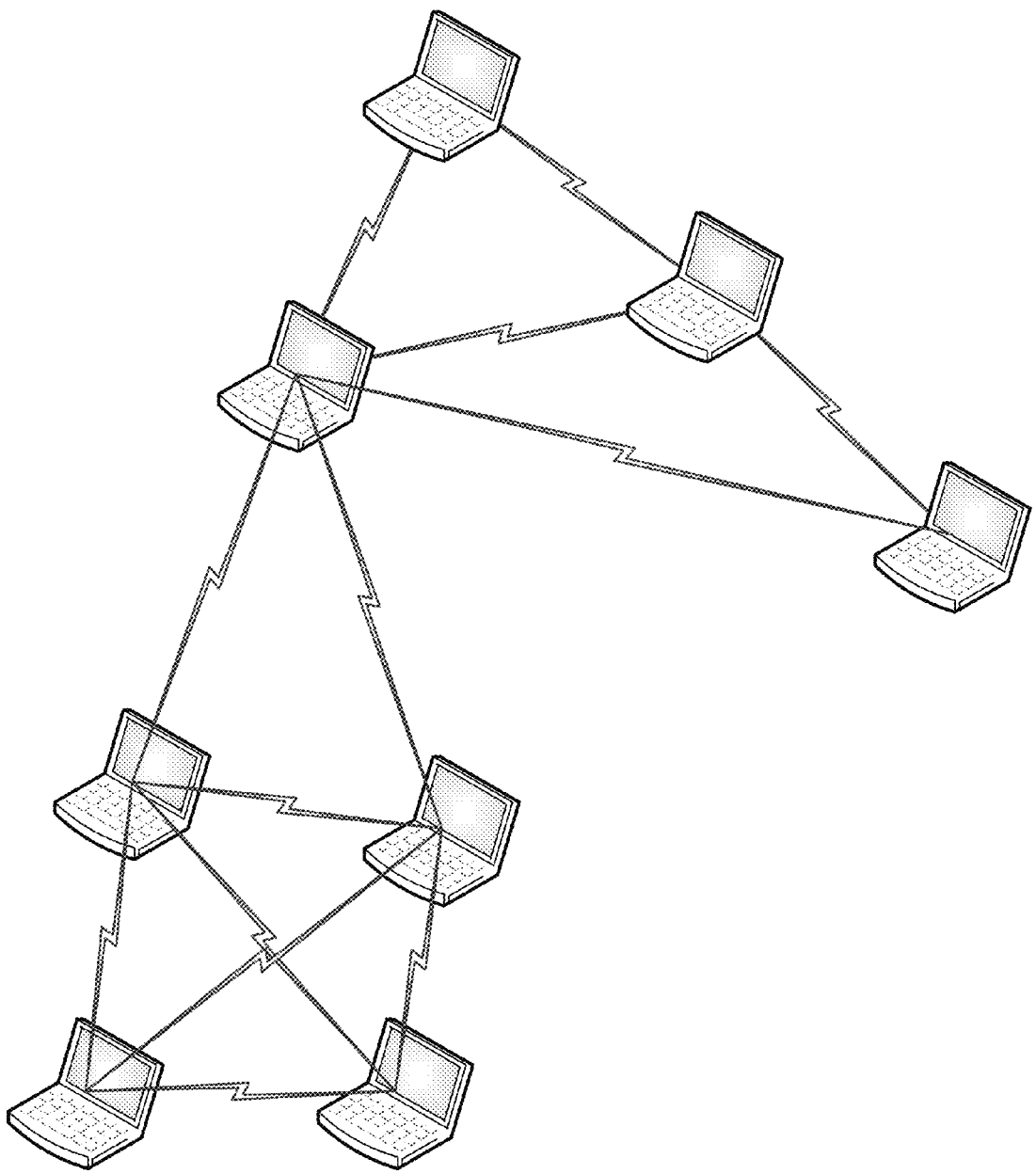
FIG. 2 is a semi-pictorial diagram of a mobile ad-hoc network system.
Figure 3:
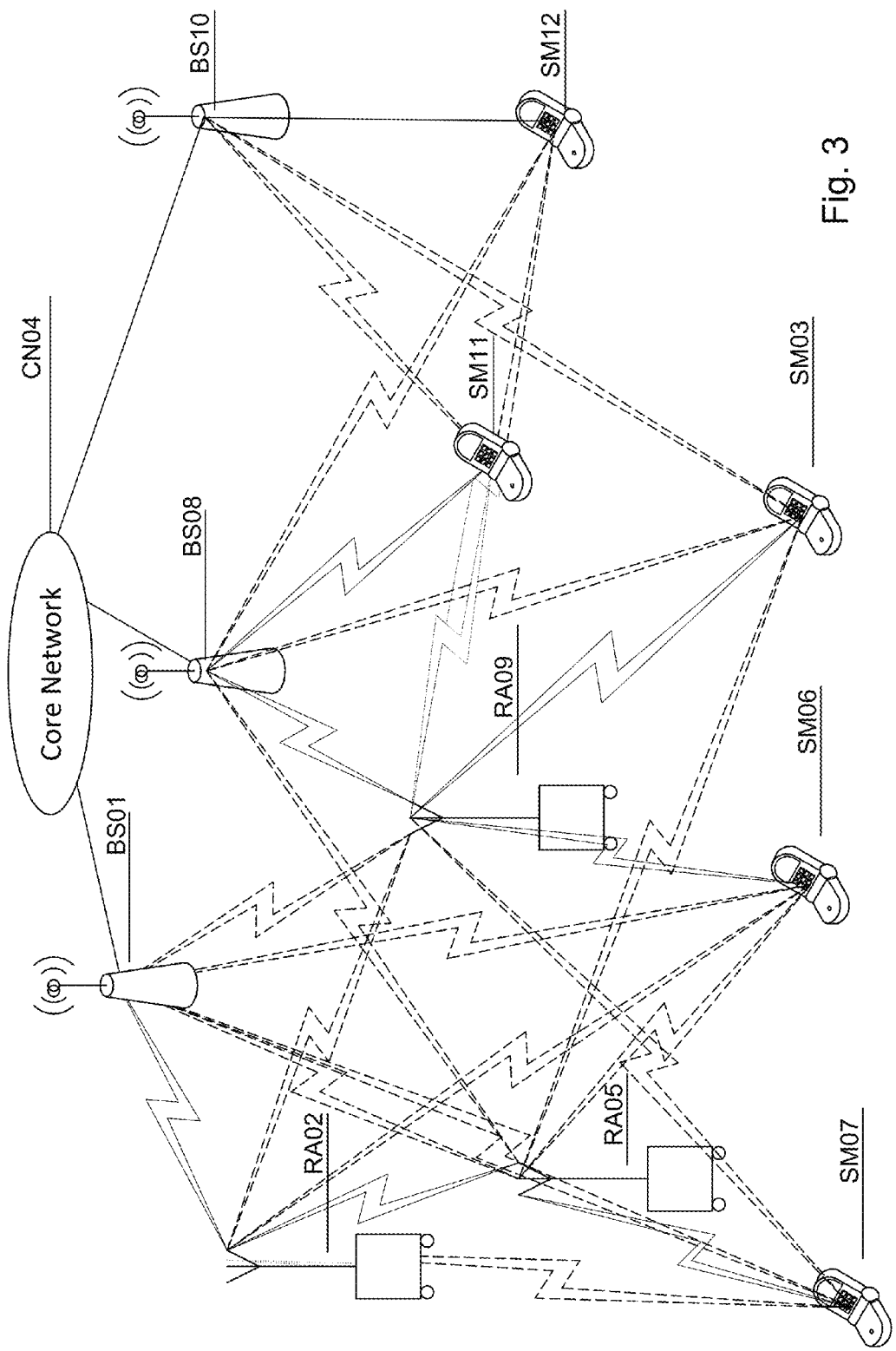
FIG. 3 is a semi-pictorial diagram of an n-level hierarchical cellular system of the invention.
Figure 5:
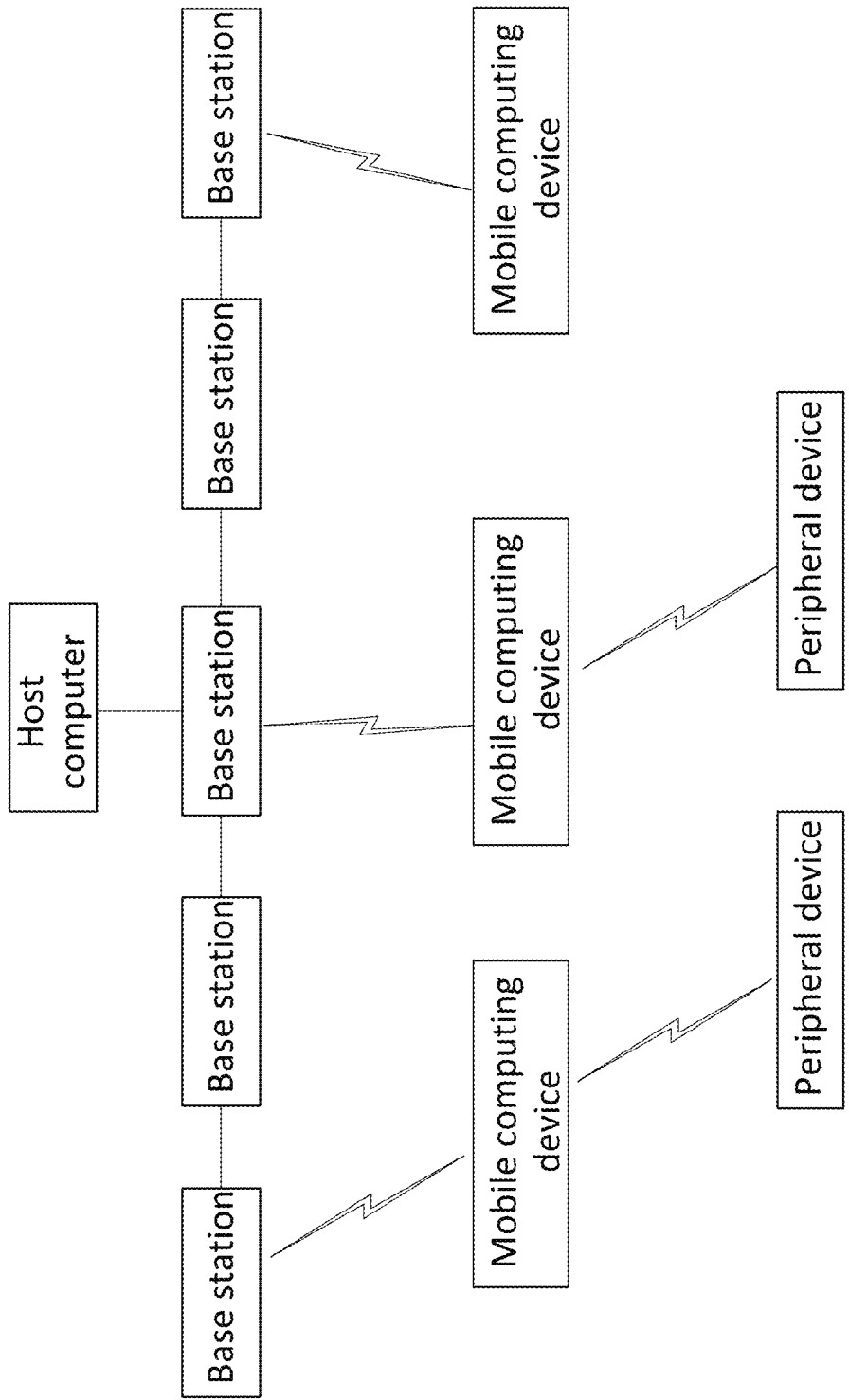
FIG. 5 is a simplified block diagram illustration of a 2-tier hierarchical LAN as described in U.S. Pat. No. 5,657,317.

The term "mobile computing device", e.g. in FIG. 5, is used herein to include any mobile communication device being a node in a communication network such as a cellular communication network, such as but not limited to a mobile telephone e.g. cellphone, smartphone, etc., as well as any computer that has a wireless modem such as a laptop with a LTE modem or a tablet having a wireless connection. It is appreciated that while many mobile communication devices have computing ability, the embodiments shown and described herein are applicable also to mobile communication devices which lack computing ability.

Figure 16C:
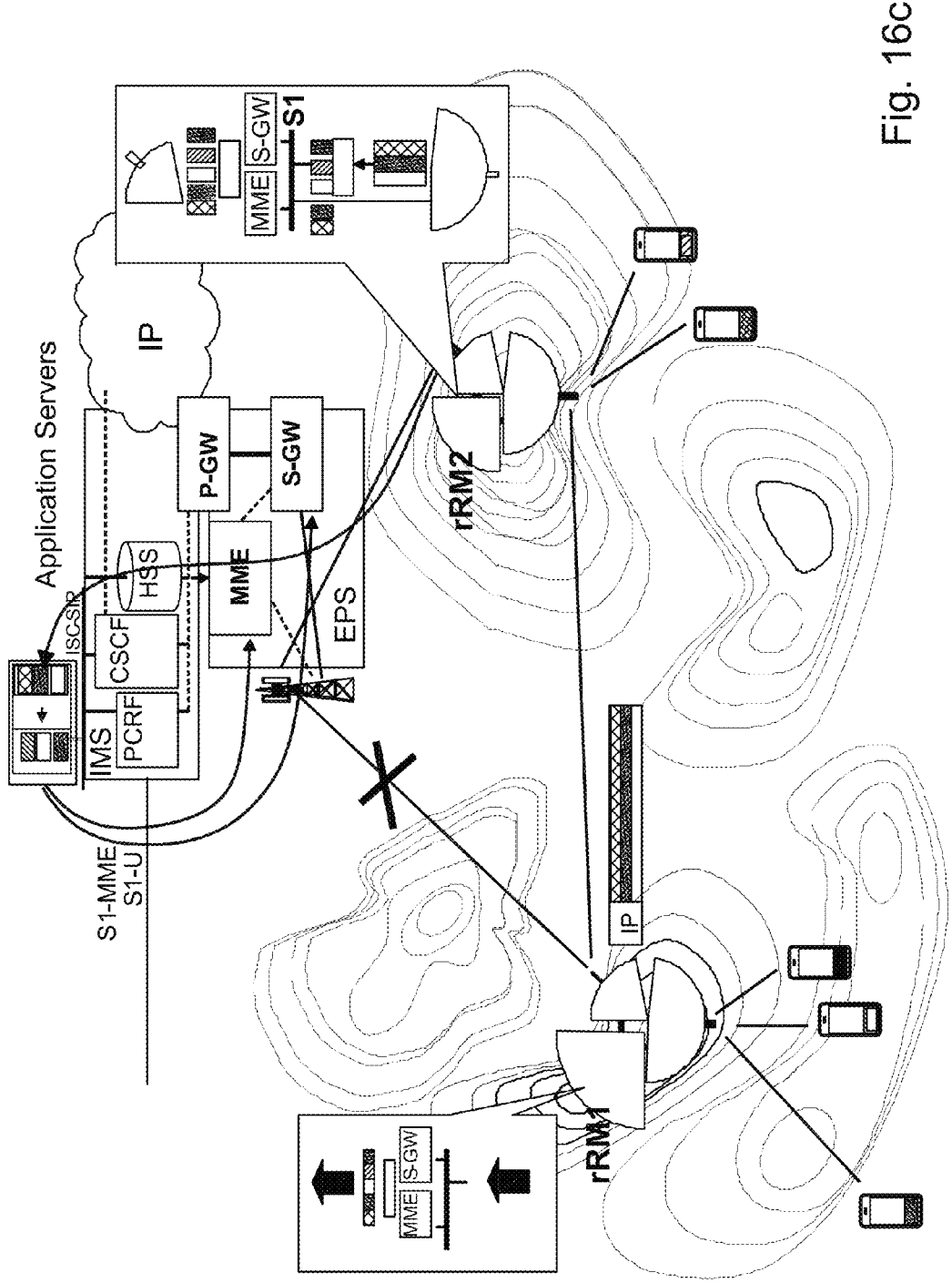

Various terms and abbreviations herein e.g. in FIGS. 16a-16c and in FIG. 18 follow LTE terminology for simplicity. However, it is appreciated that the applicability of the invention shown and described herein is not limited to LTE. For example, the methods and systems shown and described herein may be applicable to formats which are not identical to LTE but have relevant features in common with LTE.

The term "relay" is used herein to refer to a mobile node in a cellular communication network whose node has both base station and mobile communicator functionalities and is operative to serve mobile communicators, such as cellular telephones, or other relays, and to be served by base stations or other relays. Typically, each relay communicates via antennae with the mobile communicators and includes a first radio manager, base station functionality which has a physical back-connection to the first radio manager, the first radio manager having a physical connection with the relay's mobile communicator functionality which in turn communicates via antennae with at least one selectable (static) base station. Typically, the first radio manager comprises a radio resource manager and functionality for receiving information from, and sending information to, other radio managers, respectively co-located with other relays, and for using the information to determine whether to reject at least one mobile communicator seeking to be served by an individual base station associated with the individual co-located radio manager.

A particular problem characterizing mobile communication systems in which some mobile communicators communicate indirectly with the base stations, is thin-ness of the uplinks connecting the mobile communicators with the base stations. Certain embodiments of the present invention are helpful in overcoming this problem.

Mobile communication systems in which some mobile communicators are beyond-range of, hence communicate indirectly with, the base stations, typically include a core associated with base stations, mobile communicators which may or may not be within range of the base stations, and communication relaying mobile stations which have some or all of the functionalities of both base stations and mobile communicators. An example of a mobile communication system in which some mobile communicators communicate indirectly with the base stations is described in co-pending published PCT Patent Application WO/2011/092698, entitled "Cellular Communication System With Moving Base Stations And Methods And Apparatus Useful In Conjunction Therewith".

When single-hop communication is used, a communication relaying mobile station is within the range of a base station and has a mobile communicator within its own range. When multi-hop communication is used, a chain of n>=2 communication relaying mobile stations are provided, the first of which, 1, is within the range of a base station, the last of which, n, has a mobile communicator within its own range, and each adjacent pair I, i+1 of which, for I=1, ... n-1, is characterized in that the (i+1)'th communication relaying mobile station is within the range of the I'th communication relaying mobile station.

A hierarchical mobile system useful in conjunction with certain embodiments of the present invention is shown in U.S. Pat. Nos. 5,729,826 and 5,657,317 and in co-pending Published PCT Patent Application WO/2011/092698, entitled "Cellular Communication System With Moving Base Stations And Methods And Apparatus Useful In Conjunction Therewith".

Figure 7:
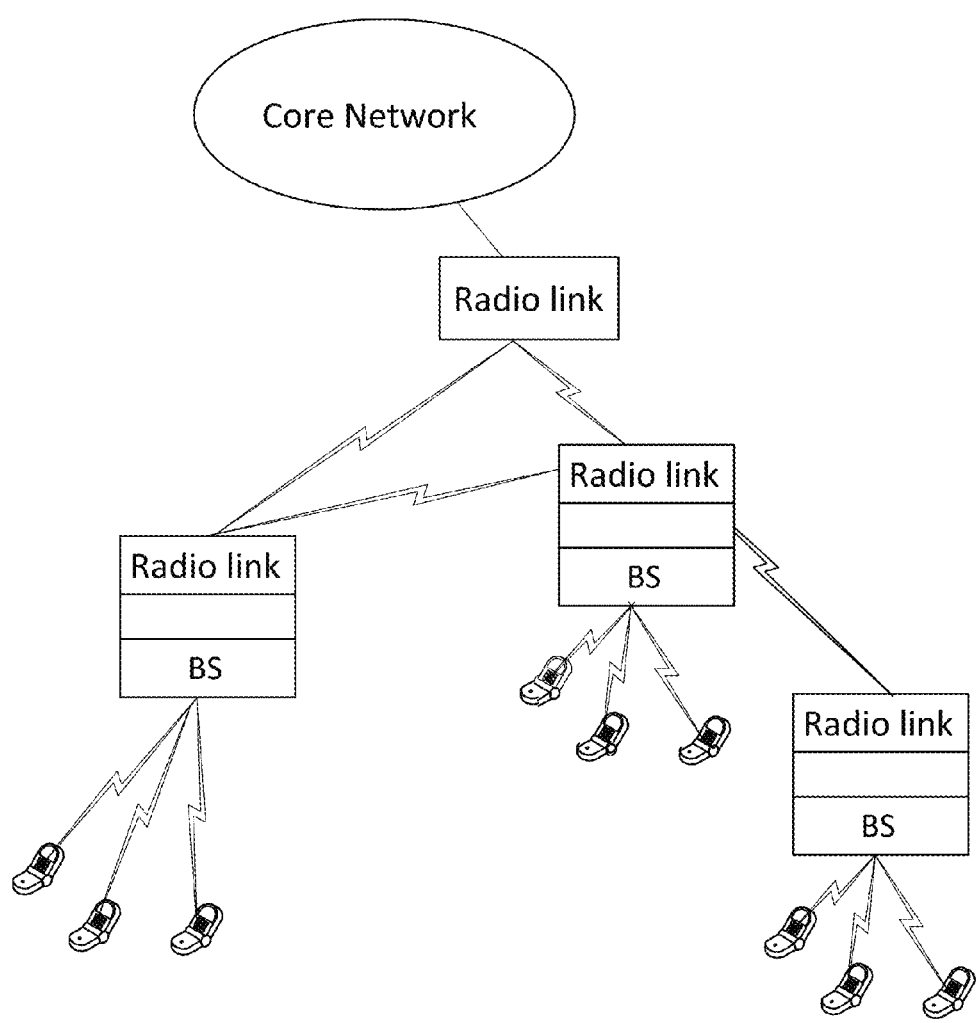
FIG. 7 is a semi-pictorial diagram of an N-tier hierarchical radio-link cellular system network constructed and operative in accordance with certain embodiments of the present invention, where N may be more than 2.

A particularly suitable hierarchical radio-link network, for implementing certain embodiments of the invention shown and described herein, is illustrated in FIG. 7.

U.S. Pat. No. 5,729,826 describes a 2-tier hierarchical cellular network, where the RAs move with traffic and communicate with the core via fixed radio ports. The RAs are provided with a high gain directional antenna. An example of a suitable network of this type is illustrated in prior art FIGS. 4A-4B. A moving base station may have an RH added to the processor block.

U.S. Pat. No. 5,657,317 describes a 2-tier hierarchical LAN. The first tier may comprise a hard wired LAN comprising radio base stations. The second tier may include a variety of roaming computer devices such as vehicle terminals and computer terminals to peripheral devices that can bind to the mobile computing device and communicate with different devices on the LAN. An example of a suitable network of this type is illustrated in prior art FIGS. 4A-4B.

Figure 6A:
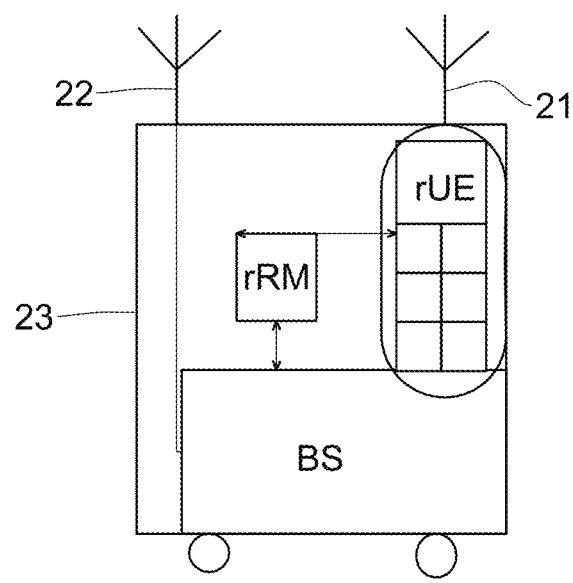
FIGS. 6A-6B are semi-pictorial diagrams of an n-tier hierarchical in-band multi-hop cellular network, using SM as a backhauling device.
Figure 6B:
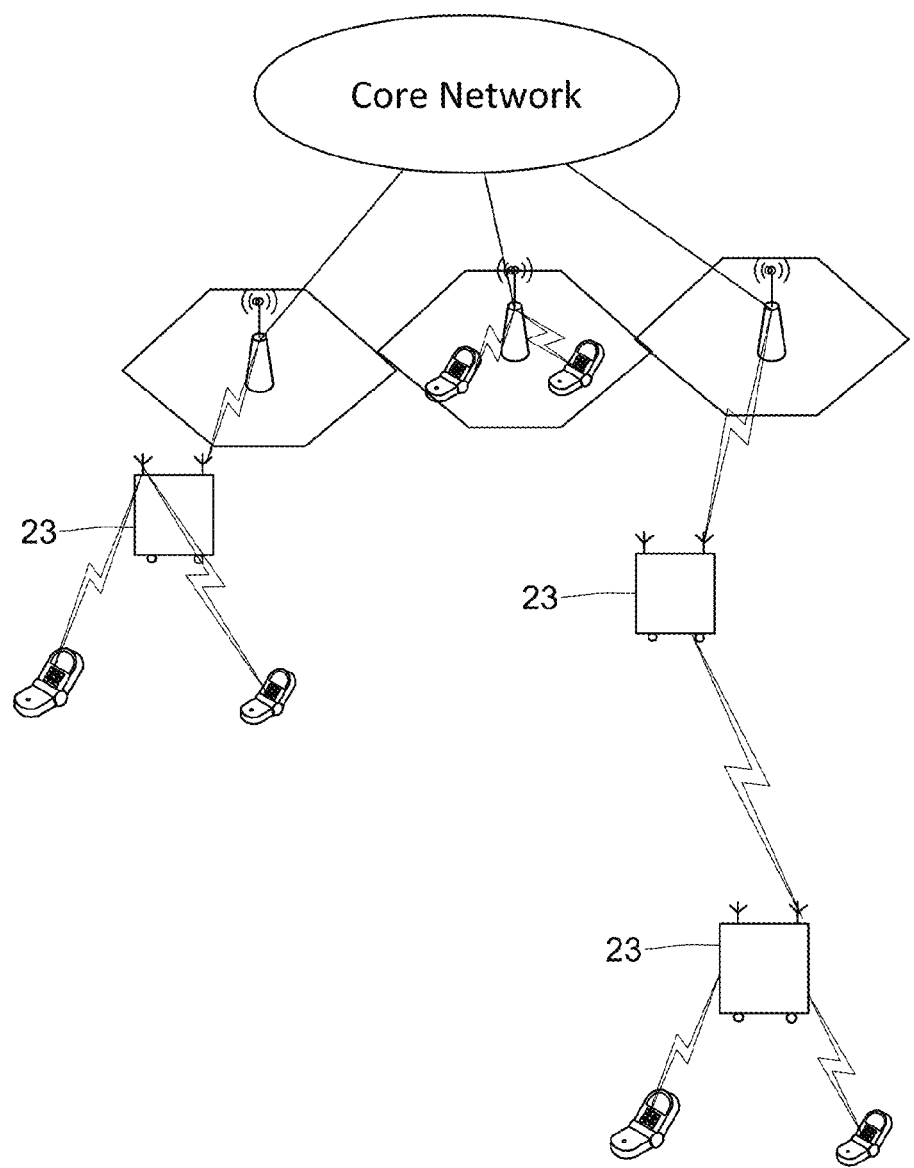

The above-mentioned co-pending Israel Patent Application No. 206455 illustrates an n-tier hierarchical in-band multi-hop cellular network using SM as a backhauling device as illustrated in FIGS. 6a-6b. The RH may be added to the relay radio/resource manager (rRM) block.

An N-tier hierarchical radio-link network, as depicted in FIG. 7, uses radio interface for backhauling, giving higher uplink BW capacity and better range cover.

A dynamic hierarchical cellular system, e.g. as in FIG. 7, typically has some or all of the following capabilities which are typically not applicable in a conventional cellular system:

a. Finding the route to SM through several hops. Due to the dynamics of the system, when a message is being routed from source to destination, there is uncertainty in the position of the destination when the message arrives; moreover, there is uncertainty in the correctness of the routing route because several nodes along the route may change their position.

b. Traffic 'bottlenecks' occur at a certain point along the backhauling route. A typical cellular system does not consider bottlenecks along the backhauling route. In a hierarchical cellular system, because of limitations in the backhauling BW, bottlenecks might occur. For example, consider that several distant users are using an RA that is connected to another RA that might be almost overloaded due to other distant users. The result of these bottlenecks is low utilization of the radio channels and an unsatisfying user experience.

c. Using a dynamic hierarchical cellular system adds two variables to the routing graph, number of hops and link quality. These two variables change rapidly, due to the dynamics of the system, and affect the utilization of the system. Hops increase delay, and link quality affects the backhauling BW.

d. Service management through several hops. Different services have different requirements; for example, services such as voice calls are not tolerated to latency, but require little BW; services like web browsing are tolerated to latency but are high BW consumers. In order to be able to support these kinds of services, different service requirements and their mutual effect on each other are taken into account. In some cases, interfaces might interfere with each other, for example when they share the same limited resource, such as uplink BW on a specific route. In such cases, the more important service request is typically given advantage.

e. Scheduling of the different services. Different services have different characteristics. Some use a constant bit rate and are not tolerated to delays, such as voice calls, and others are tolerated to delays, but are very 'greedy' in their BW consumption, and work in bursts. Once the services have been established, a special scheduler, which resides in the RA, may schedule their requests according to their service requirements.

Architecture and methods are now described which may solve some or all of the problems shown and described herein and/or may cope with transferring control and traffic information between each one of the MS, through any hierarchical cellular topology to any destination. The destination may for example be MS in the same network or any destination outside the network. Portions of the following description are applicable to the 4G 3GPP cellular network, also known as LTE (Long Term Evolution); it is appreciated that this is merely by way of example and the embodiments shown and described herein are suitable for a wide variety of cellular networks, mutatis mutandis.

Figure 8:
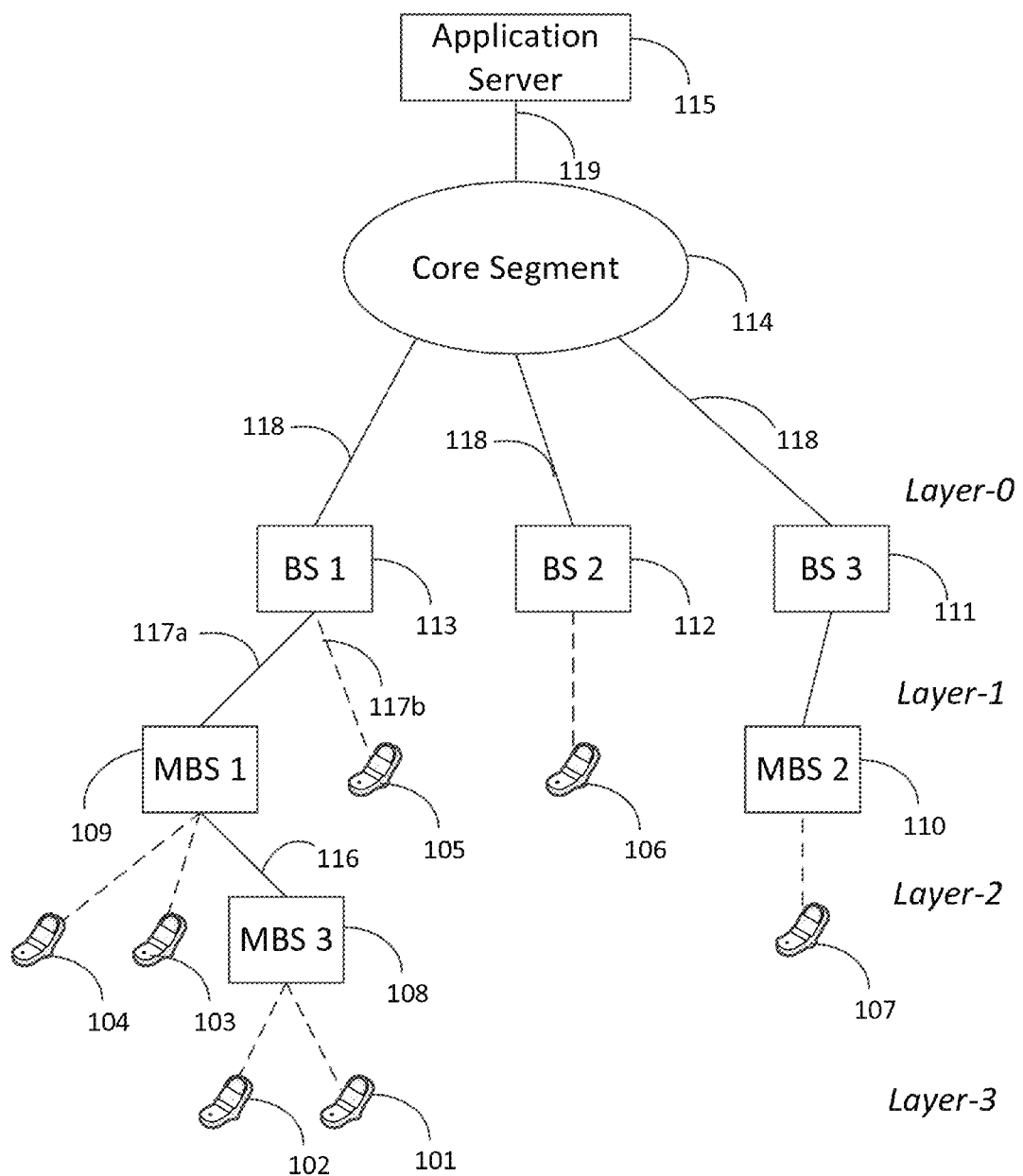
FIGS. 8, 9A-9B, 10-11, 12A-12B, and 13-15 illustrate Architecture and Methods for Traffic Management by Tunneling in Hierarchical Cellular Networks which may be used stand-alone or to modify the apparatus of FIGS. 1-7 or the apparatus described in U.S. Pat. No. 5,729,826, or the apparatus of U.S. Pat. No. 5,657,317, or the apparatus described in co-pending Published PCT Patent Application WO/2011/092698, entitled "Cellular Communication System With Moving Base Stations And Methods And Apparatus Useful In Conjunction Therewith", and apparatus useful in conjunction therewith, in accordance with certain embodiments. The embodiments illustrated in these Figs. may be used in conjunction with any of the systems and functionalities shown in FIGS. 1-7 separately or in any combination.

Either or preferably both of the following may be added to the architecture of the hierarchical cellular network e.g. as shown at FIG. 8:

A. Tunneling Subsystem inside each 4G mobile base station (MeNB) (Mobile evolved Node B) 108, 109, 110. The tunneling typically performs encapsulation and de-capsulation inside certain or each 4G mobile base station (MeNB) located at lower layers of the hierarchic eUTRAN tree.

The tunneling subsystem typically resides behind the core network, where in fact, typically, all services and application reside. The tunneling subsystem is typically operative only for removing an encapsulation header or for adding all the headers (in case of a multi-hop) according to the route to the designated address.

B. Tunneling Server as Part of the Core Segment 114.

The tunneling server may be located at any suitable location such as any of the following locations in the standard cellular architecture:

A Tunneling Application Server can be located as a standard Application Server 115 interfacing the Core segment 114, connecting to the core by the SGi interface 119 e.g. as described below with reference to FIG. 10. One advantage of this alternative may be the central architecture of the tunneling management at the core (single entity). A disadvantage, in certain applications, is the longer latency e.g. relative to the next alternative.

An S1 Tunneling Server can be located in a distributed way at the S1 interface 118 between eNBs (some or all) and the Core Segment e.g. as described below with reference to FIGS. 12a-12b. An advantage of this alternative may be the shorter latency with respect to the next alternative. A disadvantage, in certain applications, e.g. relative to the previous alternative, is the distributed architecture of the tunneling management at the core which may employ a large number of interfaces to the eNBs.

It is appreciated that the S1 tunneling server may be similar to an application server but instead of residing behind the core, it typically resides between the 4G base station (eNB) and the core over the S1 or X2 interface. When a message is going to a mobile base station, the S1 tunneling server knows the different headers that are to be added and forwarded to the relevant anchoring stationary base station.

a combination of the two embodiments above may be provided, namely using the preferred alternative selected as a result of several parameters such as but not limited to user priority, service type, user type.

It is appreciated that link 116 in FIG. 8 may comprise a suitable conventional link capable of having sent over it, backhauling data from the 4G mobile base station (MeNB) to the core, such as but not limited to LTE's "LTE-UU" interface.

Figure 9A:
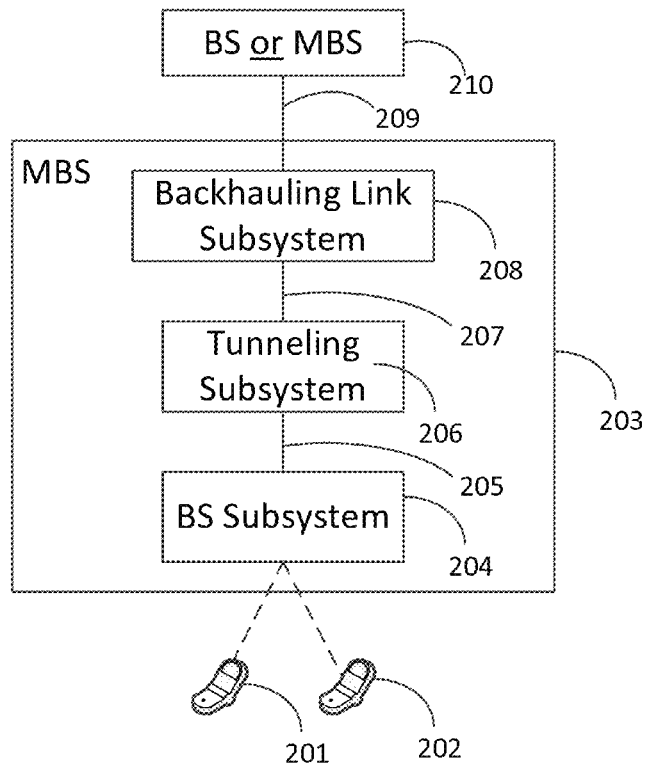

FIG. 9a presents a possible location and interface of the Tunneling Subsystem 206 inside an mobile base station (MBS) 203. As shown, the subsystem 206 typically interfaces both the Base station 204 and the Backhauling Link Subsystem 208. Element 210 may comprise any suitable base station, generally, or a mobile base station specifically.

Figure 14:
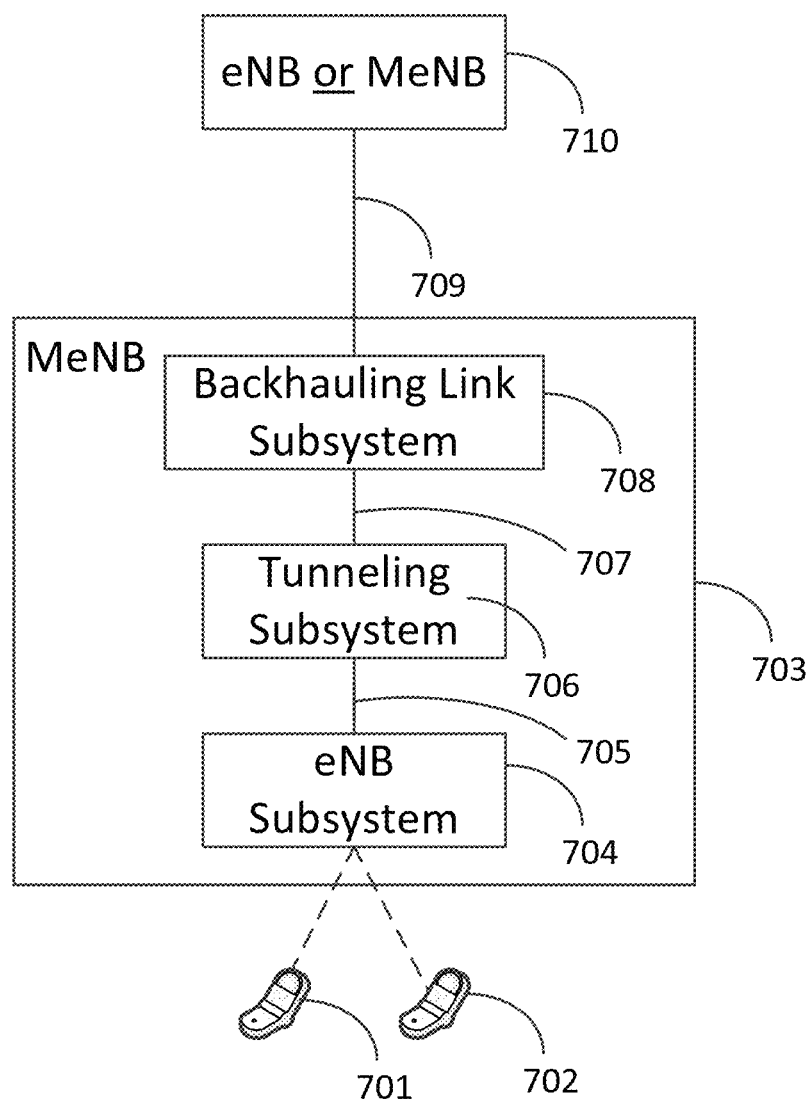

FIG. 14 shows an example of a detailed implementation for the LTE 4G mobile base station (MeNB) 703. Inside the 4G mobile base station (MeNB) 703 the interface between the Tunneling Subsystem 706 and the 4G base station (eNB) Subsystem 704 may be effected using the standard S1 interface 705.

Figure 9B:
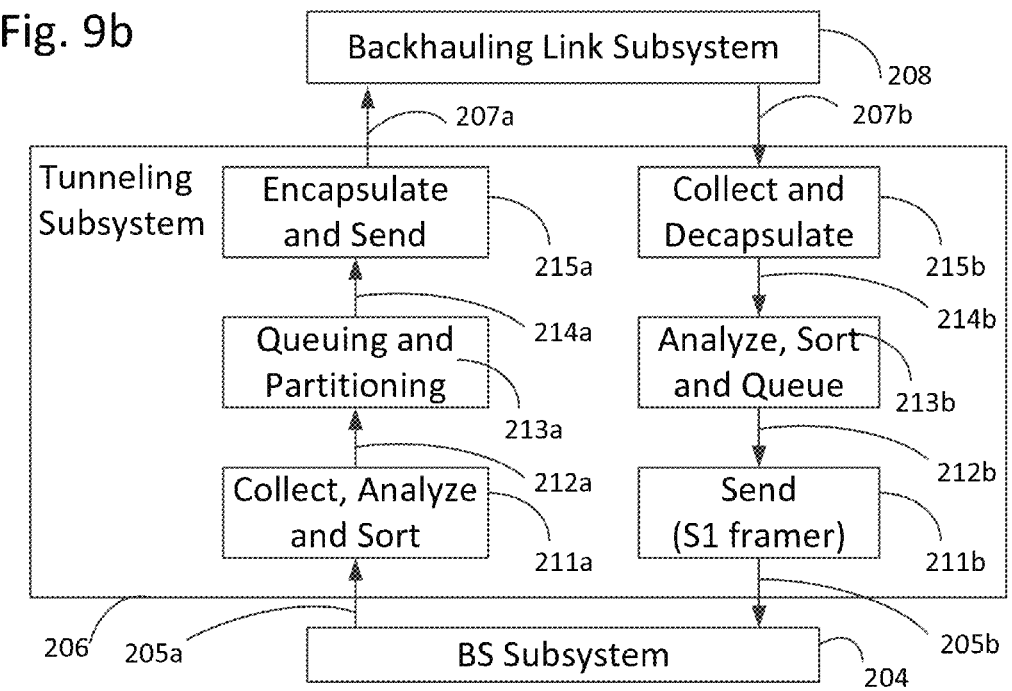

FIG. 9b shows the internal processes inside a general mobile base station (MBS) Tunneling Subsystem; as shown, the lefthand modules process inbound information heading "up" (toward the core) and the righthand modules process outbound information heading "down" (away from the core). One possible LTE implementation is described below.

A suitable Inbound path, from the 4G (optionally) base station Subsystem to the Backhauling Link Subsystem, from 205a to 207a, is now described. The Inbound processing inside the Tunneling Subsystem 206 typically begins, at 211a, by temporarily collecting the data which arrives from the Mobile Stations, analyzing it, including de-framing the S1 protocol into S1-U, S1-MME and X2, and sorting the results, for example by user ID, type of data such as control or user plane, etc. Thereafter the sorted data may be queued according to suitable rules e.g. based on some or all of user priority, service type, type of data (control/user), etc. At 213a, the data is then partitioned including deciding which of the data is to be transmitted in each of the following sessions, e.g. (a) to send data of certain user together at the same packet or (b) to send the high priority data first, or (c) to send control data first. Typically, the data is then encapsulated e.g. put together inside a single packet as a Payload, including the data elements that are next in the queue, and sent on, e.g. to the Backhauling Link Subsystem 215a. An encapsulated packet may include data from one or more data sources (s). The source Identity (such as IP address) of the encapsulated packet sent by the Backhauling Link Subsystem 208 to the upper layer in the network topology (i.e. at the 209 interface) may include the Identity assigned to the mobile base station (MBS) (such as its IP address).

Figure 11:
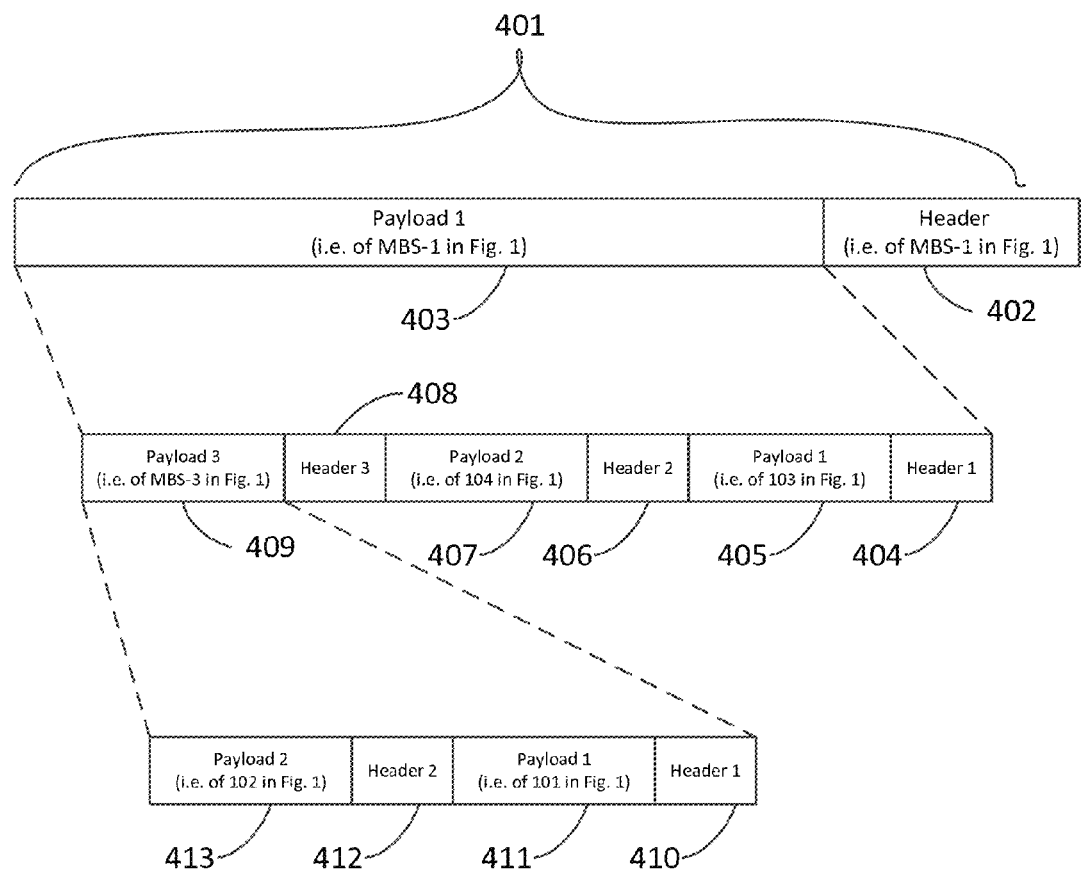

The encapsulation/decapsulation processes at the mobile, 4G (e.g.) base station (MBS e.g. MeNB) and at the Tunneling Server facilitates creation of a tunneled link between those entities. Multi-layered cellular topology typically creates tunnel-within-tunnel encapsulation that may be resolved and unfolded at the Tunneling Server. FIG. 11 is an example of multi-layered tunneling for the scenario of FIG. 8. It is appreciated that the encapsulation process is a method of adding information to data payload (i.e. by adding header to a data payload packet), e.g. as described in Wikipedia's entry on "information hiding", in order to send the data payload over a different delivery-network.

The Outbound path from the Backhauling Link Subsystem to the 4G (optionally) base station Subsystem, from 207b to 205b typically includes similar blocks, differently ordered. First collection of the incoming data is performed, followed by decapsulation, at element 215b. Then analysis of the decapsulated packets is performed, followed by sorting and queuing of the analyzed results, at element 213b. Then conversion of the individual packets to the relevant protocol is performed, at element 211b; this may comprise S1 protocol framing in LTE for 205b. The data is then sent to the 4G (optionally) base station Subsystem 204.

The destination of all mobile base station (MBS) traffic is typically the Tunneling Server and vice-versa. FIG. 10 presents a possible architecture for integrating the Tunneling Server at the Core 305—as a Tunneling Application Server 307. One possible LTE implementation for this architecture is described at FIG. 13.

The first interface of the Tunneling Application Server 307 to the Core Segment 305 is by the standard Core-to-Application Server interface, known as SGi interface for LTE 306. Through this interface the encapsulated packets from/to all the mobile base station (MBS)s, e.g. 4G mobile base stations (MeNBs), are received/sent. The first block at which these packets arrive is typically the Encapsulation Engine 308 that decapsulates the packets which arrive at the Inbound and encapsulate the traffic sent over the Outbound. Typically, engine 08 is operative for adding information to the data payload, e.g. by adding a header to a data payload packet in order to send the data payload over a different delivery-network. Some varieties of conventional encapsulation are described, for example, in the Wikipedia entry on "information hiding".

The Tunneling Application Server also includes a Virtual RAN (Radio Access Network) Manager 310 which is operative to reflect each one of the mobile, 4G (e.g.) base stations (MBSs e.g. MeNBs) back to the Core Segment as "real" 4G (optionally) base station using the standard RAN-to-Core interface (S1 interface for LTE) 311. In addition to the encapsulated traffic, each mobile, 4G (e.g.) base station (MBS e.g. MeNB) periodically sends to the Tunneling Server the list of users attached to it, e.g. inside its service area. Using all the data arriving to it from all mobile base station (MBS)s, the Virtual Radio Access Network Manager 310 is typically operative to build the topology of all mobile base station (MBS)s sub-networks and the list of all users attached to them.

The Virtual Radio Access Network Manager 310 also typically "reflects" each of the mobile, 4G (e.g.) base stations (MBSs e.g. MeNBs) to the Core segment 305 as a "virtual" 4G (optionally) base station using e.g. the standard S1 interface such that a multi-S1 interface is created at 311. Therefore, the Virtual Radio Access Network Manager typically functions as a proxy of the MeNBs interfacing the core. Encapsulation engine 308 uses this information in order to arrange and encapsulate the packets for the Outbound path, e.g. the path from the Tunneling Server to the mobile, 4G (e.g.) base station (MBS e.g. MeNB).

The encapsulation/decapsulation processes at the mobile, 4G (e.g.) base station (MBS e.g. MeNB) and at the Tunneling Server facilitates creation of a tunneled link between those entities. Multi-layered cellular topology creates tunnel-within-tunnel encapsulation that is resolved and unfolded at the Tunneling Server. FIG. 11 is an example of multi-layered tunneling for the scenario of FIG. 8.

Figure 12A:
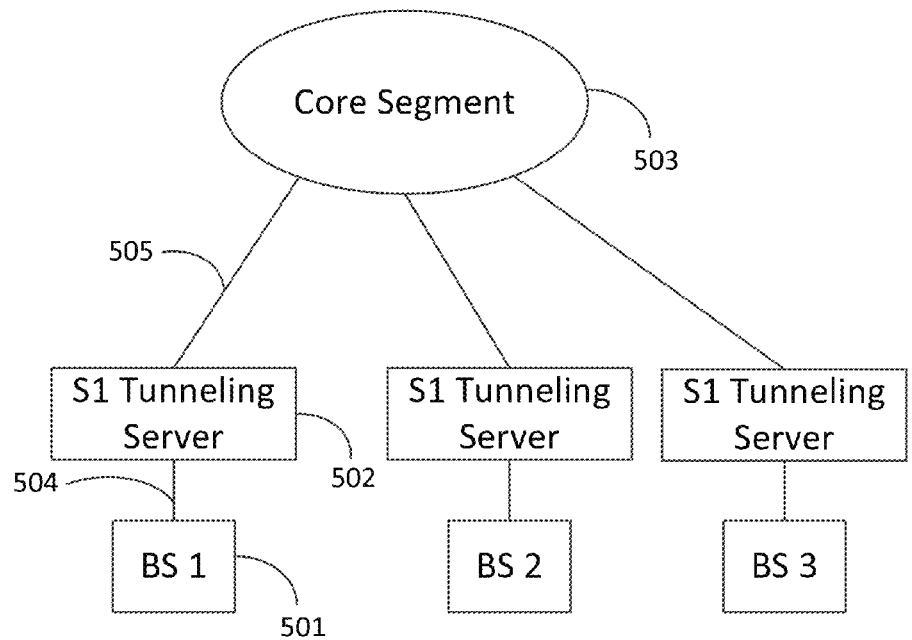
Figure 12B:
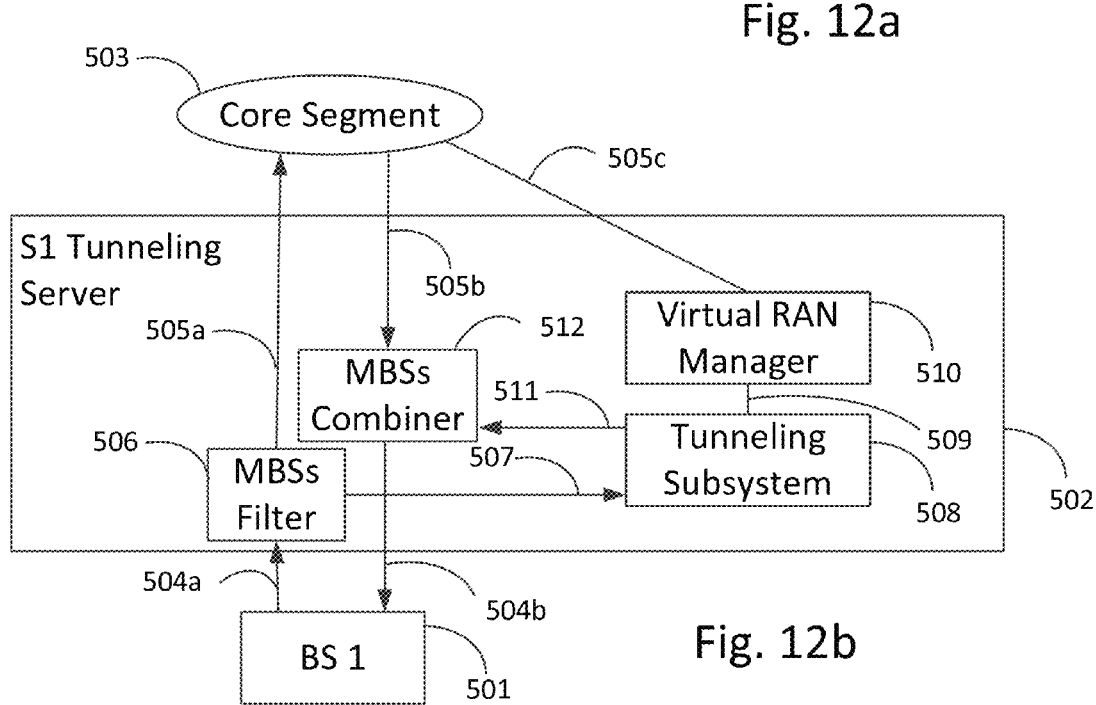

FIG. 12a illustrates another alternative for the Tunneling Server integration to the Core Segment 503 as S1 Tunneling Server 502. In this embodiment, the S1 Tunneling Server 502 is located between the 4G (optionally) base station 501 and the Core Segment 503. It interfaces the 4G (optionally) base station using the standards S1 interface 504. The interface to the Core Segment 505 may be effected by multi-S1 interfaces, one per mobile, 4G (e.g.) base station (MBS e.g. MeNB) whose packets arrive at this Tunneling Server. FIG. 12b is a simplified block diagram of a S1 Tunneling Server 502 according to certain embodiments of the present invention. The first block in the Inbound flow may be the mobile base station (MBS)s Filter 506 which sorts all the incoming user-plane packets (of S1-U interface).

Typically, by using a known list of mobile, 4G (e.g.) base stations (MBSs e.g. MeNBs) the filter 506 detects the mobile, 4G (e.g.) base stations' (MBSs' e.g. MeNBs') packets, filters them from the S1-U stream and sends the stream without the mobile, 4G (e.g.) base stations' (MBSs' e.g. MeNBs') packets directly to the Core segment e.g. using the standard Inbound S1-U interface 505a and the stream of only mobile, 4G (e.g.) base stations (MBSs e.g. MeNBs) packets to the Tunneling Subsystem 508 using any appropriate interface 507, e.g. the standard S1-U protocol interface.

The Tunneling Subsystem 508 may include the same elements as the Tunneling Subsystem of the mobile, 4G (e.g.) base station (MBS e.g. MeNB) e.g. as described at FIG. 9b. The Tunneling Subsystem then processes the incoming mobile, 4G (e.g.) base station (MBS e.g. MeNB) only packets stream the same way as the 207b to 205b elements chain, typically for every sole mobile, 4G (e.g.) base station (MBS e.g. MeNB) detected, typically in a recursive manner in order to decapsulate tunnel-inside-tunnel cases e.g. multi-layer mobile, 4G (e.g.) base stations (MBSs e.g. MeNBs) topology. After unfolding all the mobile, 4G (e.g.) base stations' (MBSs' e.g. MeNBs') packets, the Tunneling Subsystem 508 transfers this data to the Virtual Radio Access Network Manager 510 that reflects each of the mobile, 4G (e.g.) base stations (MBSs e.g. MeNBs) to the Core segment 503 as a "virtual" 4G (optionally) base station using e.g. the standard S1 interface such that multi-S1 interface is created at 505c which may have a similar role as the Virtual Radio Access Network Manager 310 shown at FIG. 10. Therefore, the Virtual Radio Access Network Manager typically functions as a proxy of the MeNBs interfacing the core.

Conversely, user-plane packets not directed to mobile, 4G (e.g.) base station (MBS e.g. MeNB) may be sent via a standard S1-U interface 505b directly to the mobile, 4G (e.g.) base stations (MBSs e.g. MeNBs) Combiner 512. The S1 interface typically resides over IP. Creation of multiple S1-interface may be effected e.g. by opening several connections. The Virtual Radio Access Network Manager, which may also store the mobile, 4G (e.g.) base stations' (MBSs' e.g. MeNBs') topology tree, typically passes these packets and their attached instructions, e.g. resulting from analysis of the topology tree, via a dedicated interface 509 to the Tunneling Subsystem 508.

Other packets that are addressed to mobile, 4G (e.g.) base station (MBS e.g. MeNB) are sent to the "virtual" 4G (optionally) base station which may form part of the Virtual Radio Access Network Manager 510. The Virtual Radio Access Network Manager, which may also store the mobile, 4G (e.g.) base stations' (MBSs' e.g. MeNBs') topology tree, passes those packets and their attached instructions, e.g. resulting from analysis of the topology tree, via a dedicated interface 509 to the Tunneling Subsystem 508.

Using these attached instructions, the Tunneling Subsystem 508 is typically operative to form the encapsulated packet such that every packet addressed to MS/mobile communication device (UE) which is connected to mobile, 4G (e.g.) base station (MBS e.g. MeNB) reaches its destination. The encapsulated packets are then typically passed to the mobile, 4G (e.g.) base stations (MBSs e.g. MeNBs) Combiner 512 to be combined to the non-MBS-directed packets so a single S1-U Outbound interface 504b will be formed and sent to the relevant 4G (optionally) base station 501. The term "relevant" here refers to the 4G (optionally) base station that is the topology root to the tree where the mobile, 4G (e.g.) base station (MBS e.g. MeNB) is located.

Figure 10:
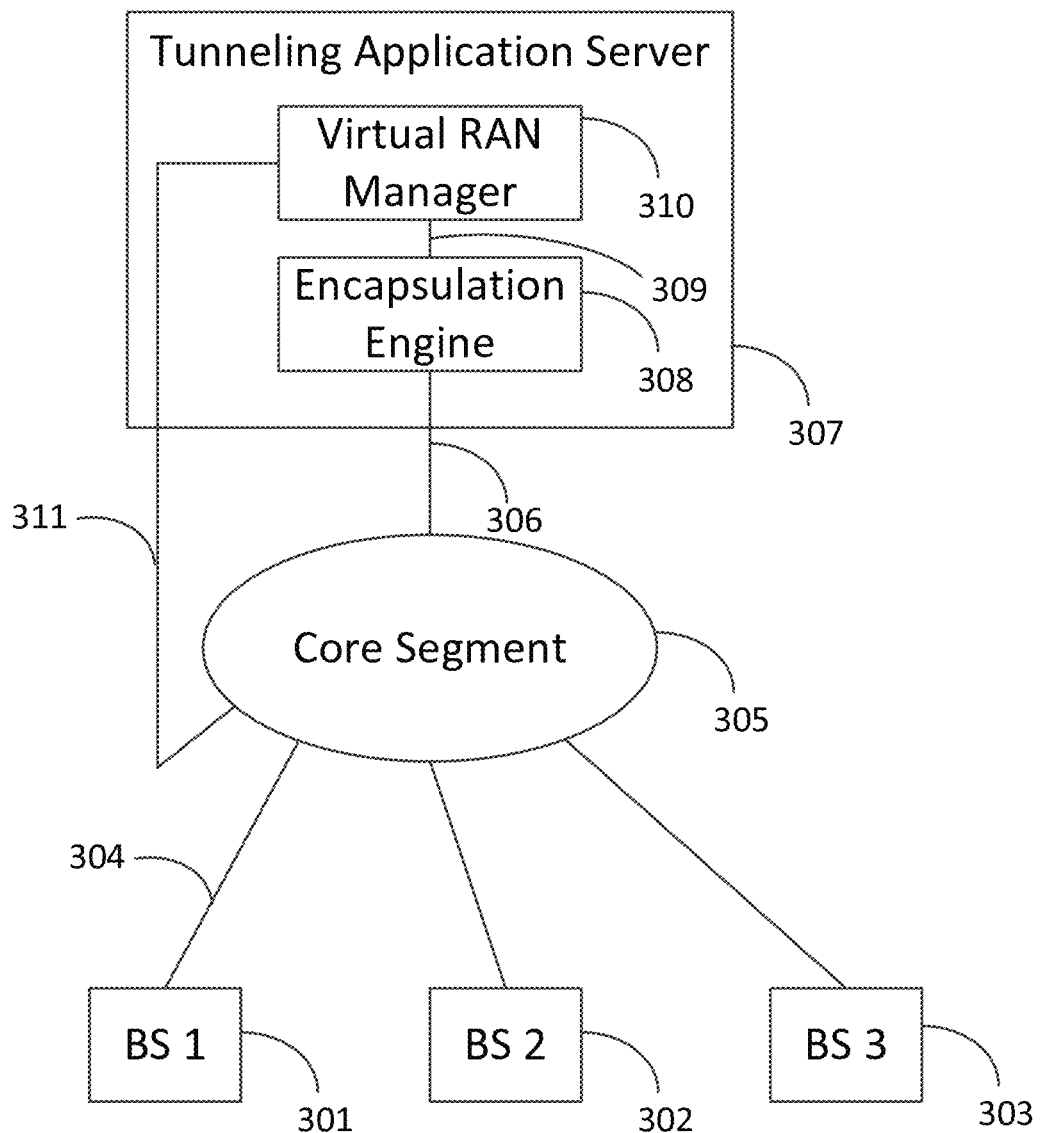
Figure 13:
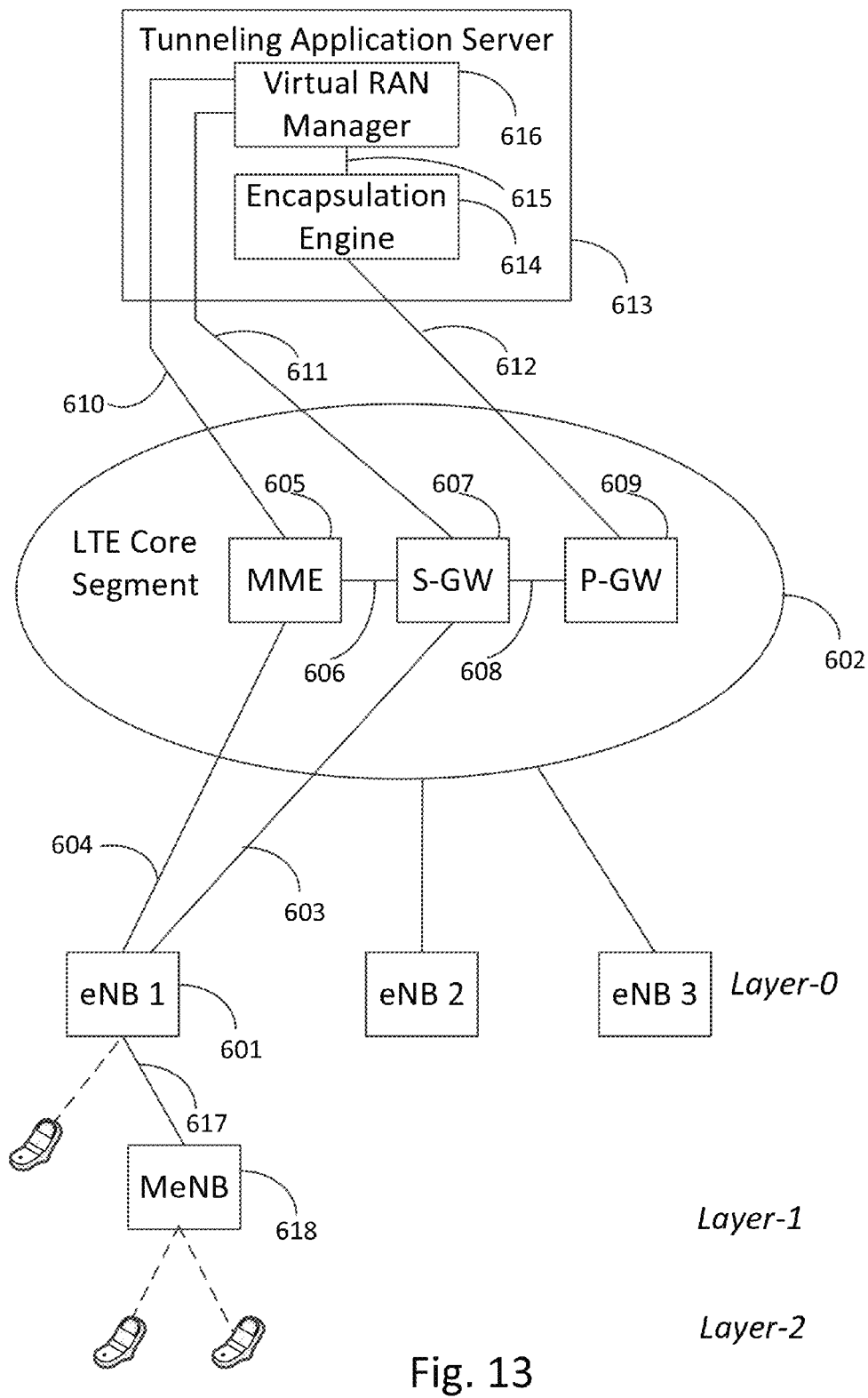

FIG. 13 illustrates an example of detailed implementation of the Tunneling Application Server alternative configuration suitable for an LTE-based cellular network e.g. as shown in FIG. 10. The 4G base station (eNB) typically includes two standardized interfaces to the LTE Core: S1-U 603 and S1-MME 604. As previously described, all layer-1 4G mobile base station (MeNB) user-plane traffic e.g. including the encapsulated UEs (user equipment e.g. mobile communication device) and 4G mobile base station (MeNB) s from layer-2 may be addressed to the Tunneling Application Server 613, through the standard user-plane packet domain core chain (e.g. 4G base station (eNB) 601→S-GW 607→P-GW→Tunneling Application Server).

When arriving to the Tunneling Application Server 613 this user-plane traffic may be decapsulated recursively at the Tunneling Engine 614 such that each tree underneath each 4G mobile base station (MeNB) is unfolded and disassembled to separate clear, non-encapsulated packets. All these packets may be forwarded to the Virtual Radio Access Network Manager 616 such that each 4G mobile base station (MeNB) is reflected as "virtual" 4G base station (eNB) to the LTE Core Segment 602 using the standard LTE eUTRAN-to-Core S1 interfaces: S1-U 611 for the user-plane data and S1-MME 610 for the control plane data. These interfaces are typically identical to the "real" 4G base station (eNB) 601 interfaces: 604 vs. 610 and 603 vs. 611. For Outbound sessions this process is mirrored accordingly.

Figure 15:
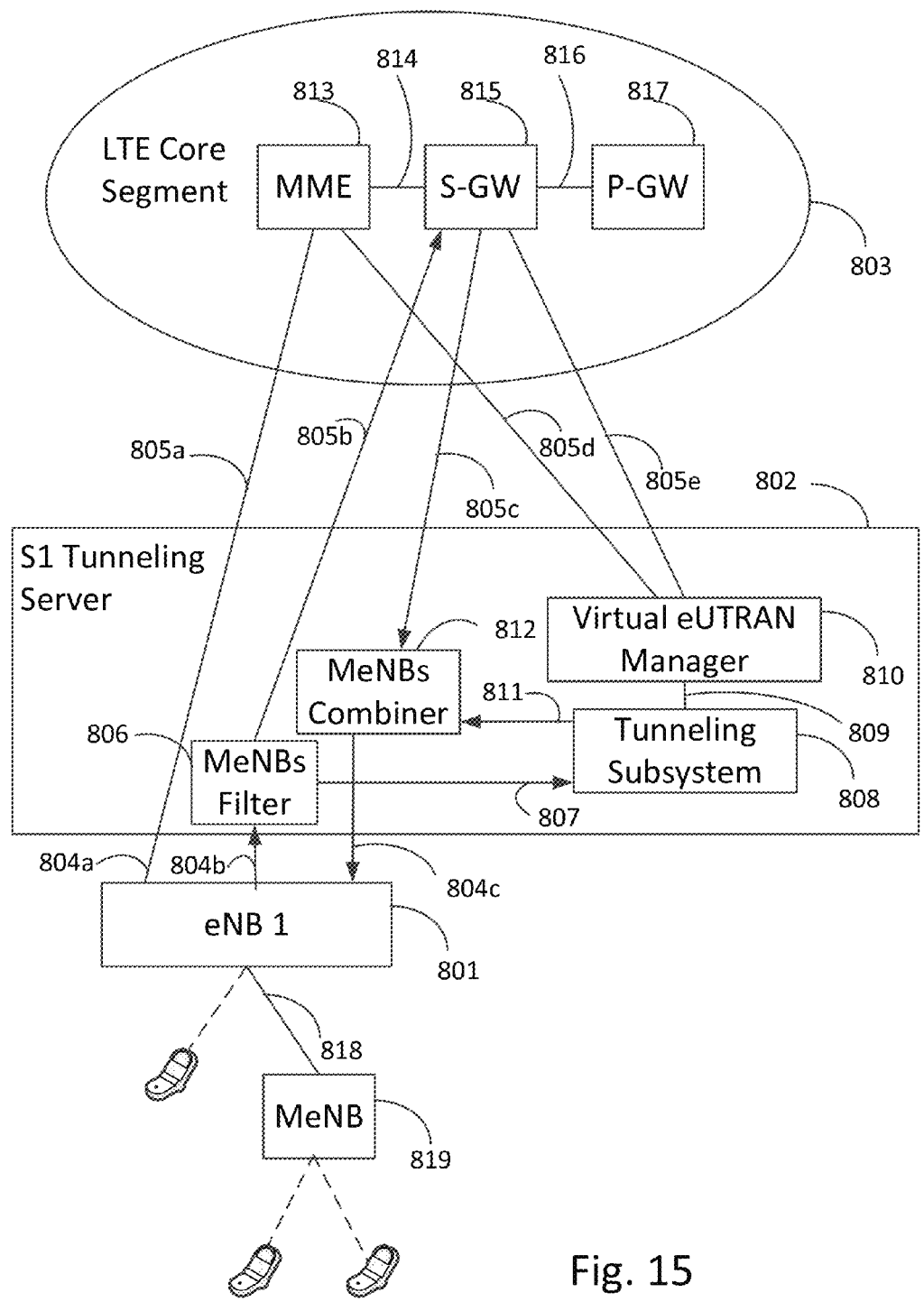

It is appreciated that FIG. 15 may form a basis for an LTE implementation of an S1 Tunneling Server alternative.

FIGS. 16A-16C illustrate embodiments of the present invention including an in-band backhauling embodiment of FIG. 16a and a multi-hop variation thereof in FIG. 16b. A network of Relays are provided. Using the terminology of co-pending Published PCT Patent Application WO/2011/092698, entitled "Cellular Communication System With Moving Base Stations And Methods And Apparatus Useful In Conjunction Therewith", the end unit of the relay, the rMS, transfers a message to the next relay, until the SMS, network base station, is reached, and similarly from that node to the core. These messages include, in addition to what the end unit of the relay (rMS) transmits, also info nation which is provided by the relay base station (rBS). For example, if the base station of the relay serves 3 end units e.g. as shown, the end unit of the relay (rMS) transfers messages which relate to these three end units. This may be transferred as follows. The end unit of the relay (rMS) may generate a payload by multiplexing or encoding all messages under its IP address. This multiplexing may include the information pertaining to the three end units which are connected to the relay radio/resource manager (rRM). In practice this multiplexing may be effected by the relay radio/resource manager (rRM) e.g. as per some or all of the following steps, suitably ordered e.g. as follows:

a. The relay radio/resource manager (rRM) communicates conventionally with its own base station, also twilled herein the rBS, and receives via the S1 protocol, the data of the end unit as well as data of its base station.

b. The relay radio/resource manager (rRM) multiplexes the data into a single payload.

c. The relay radio/resource manager (rRM) transfers this to its rMS which broadcasts it to the next base station.

None of the units of a conventional network would know how to read this payload. Therefore, an application server, e.g. as shown on the top left of FIGS. 16A-16C, may be added to the core. The above relay radio/resource manager (rRM) payload is transferred to the application server, by the network which is conventionally able to do so. The application server knows how to "open" the end unit of the relay (rMS) message and convert it to standard S1 format. The server thus speaks to the network's standard core, including the MME and S-GW, just as the base station does.

The server is typically, insofar as the network "sees", a base station. The network sees the Base Station (rBS) of the Relay and simulates a large number of base stations (rBS). This reflects the Relays and whoever is connected thereto, in a standard manlier.

According to certain embodiments, the quality grade of each section may be determined by two factors: the reference signal's Signal to Interference-plus-Noise Ratio (rsSINR), in conjunction with the statistical behavior of the reference signal's Signal to Interference-plus-Noise Ratio (rsSINR), e.g. by changing its standard deviation and average. Another factor may be as follows: If many channels "flow into" a single section, its QGR (quality grade result) may be reduced, because even if its Signal to Interference-plus-Noise Ratio (SINR) is good and there are no deviations, i.e. its behavior is good, if all pass through this section, the quality may be reduced and therefore, its score is typically reduced.

The term QGR (quality grade result) is a known term described in co-pending Published PCT Patent Application WO/2011/092698, entitled "Cellular Communication System With Moving Base Stations And Methods And Apparatus Useful In Conjunction Therewith"

The terms in the table of FIG. 17 may be construed either in accordance with any definition thereof appearing in the prior art literature or in accordance with the specification, or as stipulated in the table.

Referring now to FIG. 18, a virtual base station server (vBServ), also termed herein a "tunneling application server, may be added to, say, an LTE or other suitable cellular core network that emulates base stations that do not have direct connection to the LTE (say) core.

The virtual Base Station server can connect standard 4G base station (eNB) as well as non standard communication means like satellite, as a virtual base station to the LTE core network.

The Tunneling Application Server (vBServ) and Border Gateway or Media Gateway differ in that these entities do not imitate base stations toward the LTE core network. The BGW is connected to the IMS entities, the CSCF and the PCRF. The MGW is connected to the MGCF. The Tunneling Application Server (vBServ) is connected to the MME and the S-GW of the LTE core as a virtual eNB.

The present invention is intended to include a base station effecting any portion of any of the functionalities shown and described herein.

The present invention is also intended to include a handset effecting any portion of any of the functionalities shown and described herein.

It is appreciated that various embodiments of the invention e.g. as shown and described herein are useful in conjunction with a mobile communication network system operative in conjunction with a core network including a core device and at least one static base station, the system comprising a plurality of base stations; and a population of mobile stations communicating via antennae with the base stations; the base stations including at least one moving base station which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable static base station, wherein the first radio manager comprises a radio resource manager; and functionality for receiving information from, and sending information to, other radio managers, respectively co-located with other moving base stations, and for using the information to determine whether to reject at least one mobile station seeking to be served by an individual base station associated with the individual co-located radio manager.

It is appreciated that various embodiments of the invention e.g. as shown and described herein are suitable for multi-hop applications in which at least one relay is served by another relay rather than being served directly by a base station.

It is appreciated that various embodiments of the invention e.g. as shown and described herein are suitable for application to a wide variety of mobile communication technologies. For example:

3GPP Long Term Evolution (LTE), is a standard in mobile network technology which provides the following features:
Peak download rates of 326.4 Mbit/s for 4×4 antennae, and 172.8 Mbit/s for 2×2 antennae (utilizing 20 MHz of spectrum).[8]
Peak upload rates of 86.4 Mbit/s for every 20 MHz of spectrum using a single antenna.[8]
Five different terminal classes have been defined from a voice centric class up to a high end terminal that supports the peak data rates. All terminals will be able to process 20 MHz bandwidth.
At least 200 active users in every 5 MHz cell. (Specifically, 200 active data clients)
Sub-5 ms latency for small IP packets
Increased spectrum flexibility, with supported spectrum slices as small as 1.4 MHz and as large as 20 MHz (W-CDMA requires 5 MHz slices, leading to some problems with roll-outs of the technology in countries where 5 MHz is a commonly allocated amount of spectrum, and is frequently already in use with legacy standards such as 2G GSM and cdmaOne.) Limiting sizes to 5 MHz also limited the amount of bandwidth per handset.
In the 900 MHz frequency band to be used in rural areas, supporting an optimal cell size of 5 km, 30 km sizes with reasonable performance, and up to 100 km cell sizes supported with acceptable performance. In city and urban areas, higher frequency bands (such as 2.6 GHz in EU) are used to support high speed mobile broadband. In this case, cell sizes may be 1 km or even less.
Support for mobility. High performance mobile data is possible at speeds of up to 350 km/h, or even up to 500 km/h, depending on the frequency band used.
Co-existence with legacy standards (users can transparently start a call or transfer data in an area using an LTE standard, and, should coverage be unavailable, continue the operation without any action on their part using GSMJGPRS or W-CDMA-based UMTS or even 3GPP2 networks such as cdmaOne or CDMA2000).
Support for MBSFN (Multicast Broadcast Single Frequency Network). This feature can deliver services such as Mobile TV using the LTE infrastructure, and is a competitor for DVB—H-based TV broadcast.
The features of E-UTRAN, the air interface of LTE, are:
Peak download rates up to 292 Mbit/s and upload rates up to 71 Mbit/s depending on the user equipment category.
Low data transfer latencies (sub-5 ms latency for small IP packets in optimal conditions), lower latencies for handover and connection setup time than with previous radio access technologies.
Support for terminals moving at up to 350 km/h or 500 km/h depending on the frequency band.
Support for both FDD and TDD duplexes as well as half-duplex FDD with the same radio access technology
Support for all frequency bands currently used by IMT systems by ITU-R.
Flexible bandwidth: 1.4 MHz, 3 MHz, 5 MHz 15 MHz and 20 MHz are standardized.
Support for cell sizes from tens of meters radius (femto and picocells) up to 100 km radius macrocells
Simplified architecture: The network side of EUTRAN is composed only by the enodeBs
Support for inter-operation with other systems (e.g. GSM/EDGE, UMTS, CDMA2000, WiMAX . . . )
Packet switched radio interface.

It is appreciated that various embodiments of the invention e.g. as shown and described herein are suitable for application to LTE and/or EUTRAN technology as well as to technologies possessing some but not all of the above features.

LTE Advanced is a 4th generation standard (4G)[2] of radio technologies designed to increase the capacity and speed of mobile telephone networks. Its features may include some or all of:
Relay Nodes
mobile communication device (UE) Dual TX antenna solutions for SU-MIMO and diversity MIMO
Scalable system bandwidth exceeding 20 MHz, Potentially up to 100 MHz
Local area optimization of air interface
Nomadic/Local Area network and mobility solutions
Flexible Spectrum Usage
Cognitive radio
Automatic and autonomous network configuration and operation
Enhanced precoding and forward error correction
Interference management and suppression
Asymmetric bandwidth assignment for FDD
Hybrid OFDMA and SC-FDMA in uplink
UL/DL inter 4G base station (eNB) coordinated MIMO It is appreciated that various embodiments of the invention e.g. as shown and described herein are suitable for application to LTE-Advanced technology as well as to technologies possessing some but not all of the above features.

WiMAX (Worldwide Interoperability for Microwave Access) is a telecommunications protocol that provides fixed and fully mobile Internet access. Features include:
Adding support for mobility (soft and hard handover between base stations). This is seen as one of the most important aspects of 802.16e-2005, and is the very basis of Mobile WiMAX.
Scaling of the Fast Fourier transform (FFT) to the channel bandwidth in order to keep the carrier spacing constant across different channel bandwidths (typically 1.25 MHz, 5 MHz, 10 MHz or 20 MHz). Constant carrier spacing results in a higher spectrum efficiency in wide channels, and a cost reduction in narrow channels. It is also known as Scalable OFDMA (SOFDMA). Other bands not multiples of 1.25 MHz are defined in the standard, but because the allowed FFT subcarrier numbers are only 128, 512, 1024 and 2048, other frequency bands will not have exactly the same carrier spacing, which might not be optimal for implementations.

Advanced antenna diversity schemes, and hybrid automatic repeat-request (HARQ)

Adaptive Antenna Systems (AAS) and MIMO technology

Denser sub-channelization, thereby improving indoor penetration

Introducing Turbo Coding and Low-Density Parity Check (LDPC)

Introducing downlink sub-channelization, allowing administrators to trade coverage for capacity or vice versa Adding an extra QoS class for VoIP applications.

It is appreciated that various embodiments of the invention e.g. as shown and described herein are suitable for application to WiMax technology as well as to technologies possessing some but not all of the above features.

More generally, the methods and systems shown and described herein as being applicable e.g. to certain protocols are also applicable to protocols which are not identical to the mobile communication protocols specifically mentioned herein but have relevant features in common therewith.

Flowchart illustrations appearing herein are intended to describe steps of an example method where, alternatively, a method may be substituted which includes only some of the steps illustrated and/or a method in which the steps are differently ordered.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMS. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. Apparatus for use in conjunction with a hierarchical cellular network system having a core and a plurality of nodes, the apparatus comprising:

a mobile relay having functionalities including both base station functionality and mobile communicator functionality and operative to serve mobile communicators, including at least one relay other than said mobile relay, and to be served by the at least one relay other than said mobile relay; and wherein the at least one relay other than said mobile relay includes:
  a tunneling subsystem; and
  a backhauling link subsystem interfacing between the tunneling subsystem and a closer node from among said nodes which is closer to the core than said mobile relay;
the base station functionality interfacing between the tunneling subsystem and a mobile station or a further node from among said nodes which is further from the core than said mobile relay,
wherein the tunneling subsystem is operative to perform the following, on data arriving from the base station functionality:
  collecting said data including analyzing to identify, within said data, results to be sent; and
  encapsulating the results to be sent into packets and sending said packets to said Backhauling Link Subsystem,
wherein the core comprises an S1 tunneling server and wherein a first block in an Inbound flow comprises a mobile base station filter operative to sort incoming user-plane packets of an SI-U interface and wherein the filter, by using a known list of mobile base stations, is operative to detect the mobile base stations' packets, to filter said packets from the SI-U stream and to send the stream without the mobile base stations' packets directly to a Core segment defined by the core, wherein the filter is operative to send the stream without the mobile base stations' packets directly to a Core segment defined by the core using a standard Inbound SI-U interface and to send the stream of only mobile base stations packets to the Tunneling Subsystem using an SI-U protocol interface.

2. The apparatus according to claim 1, wherein said tunneling subsystem is also operative for:
  sorting the results, at least by user ID; and
  queuing the results as sorted by said sorting.

3. The apparatus according to claim 2, wherein said tunneling subsystem is also operative for:
  sorting the results, at least by data type (control/user); and
  queuing the results as thus sorted.

4. The apparatus according to claim 3, wherein said queuing employs rules based on user priority.

5. The apparatus according to claim 4, wherein said queuing employs rules based on service type.

6. The apparatus according to claim 3, wherein said tunneling subsystem is also operative for:
  partitioning the results as queued by said queuing including deciding which of the results are to be transmitted in each of a sequence of upcoming communication sessions.

7. The apparatus according to claim 1, wherein the core comprises an S1 tunneling server.

8. The apparatus according to claim 7, wherein the SI Tunneling Server is located between a base station and a Core Segment defined by the core and interfaces the base station using a standard S1 interface.

9. The apparatus according to claim 7, wherein a first block in an Inbound flow may be a mobile base station filter which sorts incoming user-plane packets of an SI-U interface.

10. The apparatus according to claim 1, wherein a Tunneling Application Server is provided for integrating Tunneling management at the Core Segment.

11. The apparatus according to claim 1, wherein both a Tunneling Application Server, for integrating Tunneling management at the Core Segment is provided, and wherein each encapsulated transmission is sent, depending on at least one of: user priority, required latency, user type, service type, to the Tunneling Application Server, to the S1 Tunneling Server, or to both.

12. The apparatus according to claim 11, wherein at least one encapsulated transmission is sent to the Tunneling Application Server, to the S1 Tunneling Server, or to both, depending at least in part on user priority.

13. The apparatus according to claim 11, wherein at least one encapsulated transmission is sent to the Tunneling Application Server, to the S1 Tunneling Server, or to both, depending at least in part on required latency.

14. The apparatus according to claim 11, wherein at least one encapsulated transmission is sent to the Tunneling Application Server, to the S1 Tunneling Server, or to both, depending at least in part on user type.

15. The apparatus according to claim 11, wherein at least one encapsulated transmission is sent to the Tunneling Application Server, to the S1 Tunneling Server, or to both, depending at least in part on service type.

16. A system for use with a hierarchical cellular network having a core and comprising a plurality of nodes, the system comprising:
  at least one node which comprises a mobile relay having both base station and mobile communicator functionalities and operative
  to serve mobile communicators, including at least one relay other than said mobile relay,
  and to be served by at least one relay other than said mobile relay; and
  a Virtual Radio Access Network Manager which resides in a tunneling application server residing in the core,
  and which is operative to reflect each mobile base station back to a core segment defined by the core as a real base station,
wherein at least said mobile relay includes:
  a tunneling subsystem; and
  a backhauling link subsystem interfacing between the tunneling subsystem and a closer node from among said plurality of nodes which is closer to the core than said mobile relay;
  base station functionality interfacing between the tunneling subsystem and a mobile station or a further node from among said plurality of nodes which is further from the core than said mobile relay,
  the tunneling subsystem is operative to perform the following, on data arriving from the base station functionality:
    collecting said data including analyzing to identify, within said data, results to be sent; and
    encapsulating the results to be sent into packets and sending said packets to backhauling link subsystem,
  the tunneling subsystem is operative to process incoming mobile base station only packets stream for every sole mobile base station detected, in a recursive manner in order to decapsulate tunnel-inside-tunnel cases, and
  after mobile base stations' packets have been unfolded, to generate unfolded data, the tunneling subsystem is operative to transfer said unfolded data to the Virtual Radio Access Network Manager that reflects each of the mobile base stations to a core segment.

17. The system according to claim 16, wherein the Virtual Radio Access Network Manager is operative to reflect each mobile base station back to the Core Segment defined by the core as a real base station using a standard RAN-to-Core interface.

18. The system according to claim 16, wherein the Virtual Radio Access Network Manager reflects each of the mobile base stations to a Core segment which is defined by the core as a virtual base station.

19. The system according to claim 16, wherein the Virtual Radio Access Network Manager is operative, using data arriving at the Virtual Radio Access Network Manager from all mobile base stations, to build a topology of all mobile base station subnetworks including a list of all users attached to the Virtual Radio Access Network Manager.

20. The system according to claim 16, wherein the Virtual Radio Access Network Manager is also operative to function as a proxy of the MeNBs interfacing the core by "reflecting" each of the mobile base stations to a Core segment defined by the core as a "virtual" base station using a standard S1 interface such that a multi-S1 interface is created.

21. The system according to claim 16, wherein the Virtual Radio Access Network Manager is operative to function as a proxy of MeNBs interfacing the core by reflecting each of the mobile base stations using a standard S1 interface thereby to create a multi-Si interface.

22. The system according to claim 16, wherein the Virtual Radio Access Network Manager is also operative to pass packets and attached instructions, at least said attached instructions resulting from analysis of a mobile base stations' topology tree, via a dedicated interface to a Tunneling Subsystem, and to store the mobile base stations' topology tree.

23. A method for use in conjunction with a hierarchical cellular network system having a core and a plurality of nodes, the method comprising:
providing a mobile relay with functionalities including both base station functionality and mobile communicator functionality, the mobile relay being operative to serve mobile communicators, including at least one relay other than said mobile relay, and
to be served by the at least one relay other than said mobile relay; and
wherein the at least one relay other than said mobile relay includes:
  a tunneling subsystem; and
  a backhauling link subsystem interfacing between the tunneling subsystem and a closer node from among said nodes which is closer to the core than said mobile relay;
the base station functionality interfacing between the tunneling subsystem and a mobile station or a further node from among said nodes which is further from the core than said mobile relay,
wherein the tunneling subsystem is operative to perform the following, on data arriving from the base station functionality:
  collecting said data including analyzing to identify, within said data, results to be sent; and
  encapsulating the results to be sent into packets and sending said packets to said Backhauling Link Subsystem,
wherein the core comprises an S1 tunneling server and wherein a first block in an Inbound flow which comprises a mobile base station filter is operative to sort incoming user-plane packets of an S1-U interface and wherein the filter, by using a known list of mobile base stations, is operative to detect the mobile base stations' packets, to filter said packets from the S1-U stream and to send the stream without the mobile base stations' packets directly to a Core segment defined by the core, and wherein the filter is operative to send the stream without the mobile base stations' packets directly to a Core segment defined by the core using a standard Inbound S1-U interface and to send the stream of only mobile base stations packets to the Tunneling Subsystem using an S1-U protocol interface.

* * * * *